United States Patent
Jeong et al.

(10) Patent No.: US 11,062,321 B2
(45) Date of Patent: Jul. 13, 2021

(54) AGENCY PAYMENT SYSTEM, SERVER AND CONTROLLING METHOD THEREOF

(71) Applicant: Samsung Electronics Co., Ltd., Suwon-si (KR)

(72) Inventors: Ah-reum Jeong, Suwon-si (KR); Sung-han Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 332 days.

(21) Appl. No.: 15/888,683

(22) Filed: Feb. 5, 2018

(65) Prior Publication Data
US 2018/0247311 A1  Aug. 30, 2018

(30) Foreign Application Priority Data
Feb. 24, 2017  (KR) ........................ 10-2017-0025072

(51) Int. Cl.
*G06Q 40/00* (2012.01)
*G06Q 20/40* (2012.01)
(Continued)

(52) U.S. Cl.
CPC .......... *G06Q 20/405* (2013.01); *G06Q 20/02* (2013.01); *G06Q 20/322* (2013.01); *G06Q 2220/00* (2013.01)

(58) Field of Classification Search
USPC .................. 705/38, 40, 37, 45, 76; 380/282; 709/219; 235/380, 379
See application file for complete search history.

(56) References Cited

U.S. PATENT DOCUMENTS 6,324,525 B1 * 11/2001 Kramer .................. G06Q 20/00
705/40
7,181,017 B1 * 2/2007 Nagel .................. H04L 9/0825
380/282
(Continued)

FOREIGN PATENT DOCUMENTS

EP          3 032 478 A1    6/2016
KR     10-2006-0129825 A   12/2006
(Continued)

OTHER PUBLICATIONS

An analysis and comparison of different types of electronic payment systems; PICMET '01. Portland International Conference on Management of Engineering and Technology. Proceedings vol. 1: Book of Summaries (IEEE Cat. No. 01CH37199) (vol. Supplement, pp. 38-45 vol. 2); Zon-Yau Lee; Hsiao-Cheng Yu (Year: 2001).*

(Continued)

*Primary Examiner* — Tien C Nguyen
(74) *Attorney, Agent, or Firm* — Jefferson IP Law, LLP

(57) ABSTRACT

A controlling method of a server is provided. The method includes, in response to receiving a request for agency payment approval including expected payment associated with agency payment, account information of the first user, and information associated with one or more second users from a terminal device of the first user, transmitting a message inquiring about approval or disapproval on the request for agency payment approval to a terminal device of the second user, in response to receiving an approval including account information of the second user from the terminal device of the second user, transmitting an approval message with respect to the request for agency payment approval, and in response to receiving payment information of the first user with respect to the agency payment, transmitting account transfer information for requesting remittance from (Continued)

an account of the second user to an account of the first user, to a financial transaction server associated with the account of the second user.

17 Claims, 16 Drawing Sheets

(51) Int. Cl.
  *G06Q 20/32* (2012.01)
  *G06Q 20/02* (2012.01)

(56) References Cited

U.S. PATENT DOCUMENTS

| | | | |
|---|---|---|---|
| 7,805,376 B2* | 9/2010 | Smith | G06Q 30/06 705/64 |
| 8,606,720 B1* | 12/2013 | Baker | G06Q 20/3674 705/76 |
| 9,355,394 B2 | 5/2016 | Gupta | |
| 2004/0210531 A1* | 10/2004 | Barron | G06Q 20/1085 705/44 |
| 2007/0040020 A1* | 2/2007 | Anderson | G06Q 20/04 235/380 |
| 2014/0156508 A1 | 6/2014 | Argue et al. | |
| 2015/0310408 A1 | 10/2015 | Anderson | |
| 2016/0117667 A1 | 4/2016 | Kang et al. | |
| 2016/0267444 A1 | 9/2016 | Mutahi | |
| 2018/0150824 A1 | 5/2018 | Baek et al. | |

FOREIGN PATENT DOCUMENTS

| | | |
|---|---|---|
| KR | 10-2007-0045433 A | 5/2007 |
| KR | 10-2011-0082501 A | 7/2011 |
| KR | 10-1212236 B1 | 12/2012 |
| KR | 10-2013-0122151 A | 12/2013 |
| KR | 10-2014-0066354 A | 6/2014 |
| KR | 10-2015-0061863 A | 6/2015 |
| WO | 2015/023713 A2 | 2/2015 |
| WO | 2016-190716 A1 | 12/2016 |

OTHER PUBLICATIONS

Extended European Search Report dated Dec. 3, 2019, issued in the European Application No. 18756941.3.
European Office Action dated Feb. 26, 2021, issued in the European Patent Application No. 18756941.3.

* cited by examiner

AGENCY PAYMENT SYSTEM, SERVER AND CONTROLLING METHOD THEREOF

CROSS-REFERENCE TO RELATED APPLICATION(S)

This application claims the benefit under 35 U.S.C. § 119(a) of a Korean patent application filed on Feb. 24, 2017 in the Korean Intellectual Property Office and assigned Serial number 10-2017-0025072, the entire disclosure of which is hereby incorporated herein by reference.

TECHNICAL FIELD

The present disclosure relates to systems, servers, and methods related to an agency payment system, a server and a controlling method thereof. More particularly, the present disclosure relates to a server for processing agency payment and a controlling method thereof.

BACKGROUND

Recently, with the advanced electronic and information technology (IT) technologies, a variety of payment methods to purchase goods or services have been provided. Consumers purchasing goods or services at offline shops may need to make a payment using various cards, such as credit cards, debit cards, or cash cards, as well as cash. The consumers may also purchase goods or services or make a payment at online shops through various electronic commercial transaction means. The recent introduction and commercialization of various mobile payment services have enabled ways of making a payment using mobile devices, such as smart phones, and the like.

As the various advancing electronic financial systems or electronic commercial transaction systems have been developed as described above, consumers can make a payment with increased convenience. However, there still remains considerable inconvenience in performing the agency payment by a consignee who purchases goods or services on behalf of a consignor and subsequent repayment for the agency payment made.

For example, when a consignor A asks his friend B to purchase product X under the condition of repaying a payment later, friend B as a consignee purchases product X and pays the price on behalf of consignor A. Thereafter, consignee B transfers product X over to consignor A and consignor A repays the payment for product X that the consignee B has previously made.

In an example, consignee B may directly meet consignor A and receive the payment for product X in cash. However, this causes inconvenience because a consignor and a consignee (agent payer) have to directly meet each other. Alternatively, consignee B may be paid for the payment through the account transfer without meeting consignor A. However, this may be problematic because the payment by way of account transfer requires inconvenient processes, such as indicating consignor A an account number of consignee B, remitting by consignor A the payment to the account of consignee B through an account transfer service provided from a bank, confirming the receipt by consignee B after remitting, or the like. Additionally, during such repayment process, personal information (e.g., account number, and the like) of consignee B can be exposed to consignor A. Further, depending on cases, when consignor A does not make the payment to consignee B, consignee B may be in trouble of being unpaid for the cost. Meanwhile, the above problem may also occur in a situation when a plurality of purchase wishers agree on a condition to do 'Dutch pay' or 'go Dutch' in which one of the purchase wishers makes an advance payment for the entire cost and later receives the payment according to the respective contracted portions of the rest purchase wishers.

Accordingly, there is a need for a new technology, which can address the issues mentioned above, such as inaccuracy and inconvenience of the repayment experienced in the repaying process of an agency payment and a risk of exposure of personal information.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus a server for processing agency payment and a controlling method thereof.

Another aspect of the present disclosure is to provide an agency payment system in which the agency payment can be immediately repaid, a server and a controlling method of the server.

In accordance with another aspect of the present disclosure, a controlling method of a server is provided. The method includes, in response to receiving a request for agency payment approval including expected payment associated with agency payment, account information of the first user, and information associated with one or more second users from a terminal device of the first user, transmitting a message inquiring about approval or disapproval on the request for agency payment approval to a terminal device of the second user, in response to receiving an approval including account information of the second user from the terminal device of the second user, transmitting an approval message with respect to the request for agency payment approval, and in response to receiving payment information of the first user with respect to the agency payment, transmitting account transfer information for requesting remittance from an account of the second user to an account of the first user, to a financial transaction server associated with the account of the second user.

Further, the request for agency payment approval may additionally include mode information indicating one of a first mode and a second mode, in which the second user pays the entire expected payment in the first mode, and the first user and the second user share the expected payment in the second mode.

In an embodiment of the present disclosure, the transmitting to a terminal device of a second user may include, when the mode information is the first mode, transmitting a message inquiring about approval or disapproval on a payment that is calculated by dividing the expected payment by a total number of the second user to the terminal device of the second user, and when the mode information is the second mode, transmitting a message inquiring about approval or disapproval on a payment that is calculated by dividing the expected payment by the total number of the first user and the second user to the terminal device of the second user.

Further, the transmitting to a financial transaction server may include, in response to receiving the payment information, transmitting account transfer information for requesting remittance of a payment that is calculated by dividing the expected payment by the total number, to a financial transaction server associated with the account of the second user.

Further, the request for agency payment approval further may include information associated with the number of users to share the expected payment, in which the transmitting to a terminal device of a second user may include transmitting a message inquiring about approval or disapproval on a payment that is calculated by dividing the expected payment by the number of the users to share the expected payment to the terminal device of the second user, and the transmitting to a financial transaction server may include, in response to receiving the payment information, transmitting account transfer information for requesting remittance of a payment that is calculated by dividing the expected payment by the total number of the users to share, to a financial transaction server associated with the account of the second user.

Further, the users to share may further include users who do not use an agency payment service through the server, in addition to the first user and the second user.

Further, the transmitting to a terminal device of a second user may include, in response to receiving an agency payment request including share information regarding a ratio to share the expected payment between the first user and the second user or a share of payment in the expected payment from the terminal device of the first user, transmitting a message inquiring about approval or disapproval on a payment that is calculated by dividing the expected payment according to the share information to the terminal device of the second user, and the transmitting to a financial transaction server may include, in response to receiving the payment information, transmitting the account transfer information for requesting remittance of a payment that is calculated by dividing the expected payment according to the share information, to a financial transaction server associated with the account of the second user.

Further, the transmitting to a terminal device of a first user may include, in response to receiving a disapproval for the request for agency payment approval from terminal devices of some a plurality of second users and receiving an approval from terminal devices of the other users among the plurality of second users, transmitting a message inquiring about whether to continue with agency payment to the terminal device of the first user, and the transmitting to a financial transaction server may include, in response to receiving the payment information, transmitting account transfer information for requesting remittance from accounts of the other users among the plurality of second users to the account of the first user, to a financial transaction server associated with each account of the other users.

Further, the message inquiring about approval or disapproval may include information associated with a payment amount requiring an approval of the second user, and the transmitting to a financial transaction server may include, when the expected payment is different from a paid amount included in the payment information, transmitting account transfer information for requesting remittance of a lesser of the payment amount requiring an approval of the second user and the paid amount, to a financial transaction server associated with an account of the second user.

Further, the transmitting to a financial transaction server may include, when the terminal device of the first user makes a payment through communication with a payment terminal device, receiving the payment information from a financial transaction server associated with the payment of the first user.

In accordance with another aspect of the present disclosure, a server is provided. The server includes a communicator configured to communicate with a terminal device of a user and a financial transaction server of the user, and a processor configured to, in response to receiving a request for agency payment approval including expected payment associated with agency payment, account information of the first user, and information associated with one or more second users from a terminal device of the first user, control the communicator to transmit a message inquiring about approval or disapproval on the request for agency payment approval to a terminal device of the second user, in response to receiving an approval including account information of the second user from the terminal device of the second user, control the communicator to transmit an approval message with respect to the request for agency payment approval, and in response to receiving payment information of the first user with respect to the agency payment, control the communicator to transmit account transfer information for requesting remittance from an account of the second user to an account of the first user, to a financial transaction server associated with the account of the second user.

Further, the request for agency payment approval may further include mode information indicating one of a first mode and a second mode, in which the second user pays the entire expected payment in the first mode, and the first user and the second user share the expected payment in the second mode.

Further, the processor may be configured to, when the mode information is the first mode, control the communicator to transmit a message inquiring about approval or disapproval on a payment that is calculated by dividing the expected payment by a total number of the second user to the terminal device of the second user, and when the mode information is the second mode, control the communicator to transmit a message inquiring about approval or disapproval on a payment that is calculated by dividing the expected payment by the total number of the first user and the second user to the terminal device of the second user.

Further, the processor may be configured to, in response to receiving the payment information, control the communicator to transmit account transfer information for requesting remittance of a payment that is calculated by dividing the expected payment by the total number, to a financial transaction server associated with the account of the second user.

Further, the request for agency payment approval may further include information associated with the number of users to share the expected payment, in which the processor may be configured to control the communicator to transmit a message inquiring about approval or disapproval on a payment that is calculated by dividing the expected payment by the number of the users to share the expected payment to the terminal device of the second user, and in response to receiving the payment information, control the communicator to transmit account transfer information for requesting remittance of a payment that is calculated by dividing the expected payment by the total number of the users to share, to a financial transaction server associated with the account of the second user.

Further, the users to share may further include users who do not use an agency payment service through the server, in addition to the first user and the second user.

Further, the processor may be configured to, in response to receiving an agency payment request comprising share information regarding a ratio to share the expected payment between the first user and the second user or a share of payment in the expected payment from the terminal device of the first user, control the communicator to transmit a message inquiring about approval or disapproval on a payment that is calculated by dividing the expected payment according to the share information to the terminal device of the second user, and in response to receiving the payment information, control the communicator to transmit the account transfer information for requesting remittance of a payment that is calculated by dividing the expected payment according to the share information, to a financial transaction server associated with the account of the second user.

Further, the processor may be configured to, in response to receiving a disapproval for the request for agency payment approval from terminal devices of some among a plurality of second users and receiving an approval from terminal devices of the other users among the plurality of second users, control the communicator to transmit a message inquiring about whether to continue with agency payment to the terminal device of the first user, and in response to receiving the payment information, control the communicator to transmit account transfer information for requesting remittance from accounts of the other users among the plurality of second users to the account of the first user, to a financial transaction server associated with each account of the other users.

Further, the message inquiring about approval or disapproval may include information associated with a payment amount requiring an approval of the second user, in which the processor may be configured to, when the expected payment is different from a paid amount included in the payment information, control the communicator to transmit account transfer information for requesting remittance of a lesser of the payment amount requiring an approval of the second user and the paid amount, to a financial transaction server associated with an account of the second user.

Further, the processor may be configured to, when the terminal device of the first user makes a payment through communication with a payment terminal device, receive the payment information from a financial transaction server associated with the payment of the first user.

According to the various embodiments described above, an agent payer may receive repayment simultaneously upon making a payment without having to expose personal information, and on the actual payer part, he or she is also enabled to repay the payment conveniently without having to go through cumbersome processes. In other words, inconvenience of the repayment and risk of exposing personal information which may occur during the agent purchasing process can be addressed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
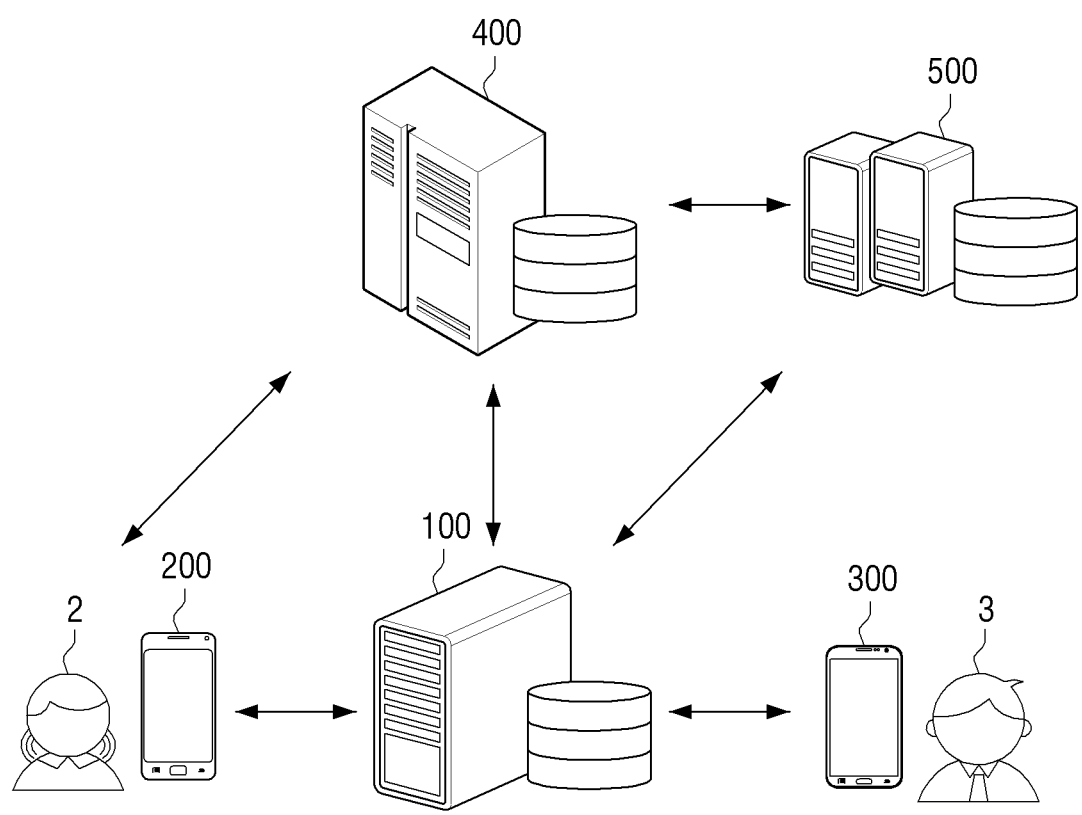
FIG. 1 is an illustration of an agency payment system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The expressions used herein are only for describing certain embodiments of the present disclosure, and not intended to limit the scope of the disclosure. Unless otherwise specified, a singular expression includes a plural expression.

The expression, "first," "second," and, the like, may be used in describing a variety of elements, but these elements should not be limited to the expression. The expressions are used only for the purpose of distinguishing one element from another.

The expression 'comprise' or 'have' used herein intend to designate an existence of operations, elements, components or a combination of these, and accordingly, this should not be understood as precluding an existence or a possibility of adding one or more of other characteristics, numbers, operations, elements, components or a combination of these.

Further, in embodiments of the present disclosure, the term, such as "module," "unit," "part," or the like, are used to refer to elements for performing at least one function and operation, and they may be implemented as hardware, software, or combination of hardware and software. Further, a plurality of "modules," "units," "parts," or the like, may be integrated into at least one module or chip to be implemented as at least one processor (not illustrated), except for an example in which each needs to be implemented as separate specific hardware.

The following will specifically describe various embodiments of the present disclosure by referring to attached drawings.

FIG. 1 is an illustration of an agency payment system according to an embodiment of the present disclosure.

Referring to FIG. 1, the agency payment system includes a server 100, a terminal device 200 of a first user 2, a terminal device 300 of a second user 3, a financial transaction server 400 associated with payment of the first user 2, and a financial transaction server 500 associated with an account of the second user 3.

The first user 2 is the one that is entrusted by the second user 3 to make the advance payment for the goods or services (hereinafter, collectively referred to as 'goods') on sale at online or offline shops, and the first user 2 makes the advance payment for the purchased goods and receives a payment for the advance payment from the second user 3. The second user 3 is one that assigns the first user 2 with the advance payment for the goods, and the second user 3 repays the payment the first user 2 made on behalf of the second user 3. Therefore, the first user 2 may be referred to as 'agent payer', 'agent purchaser', 'consignee of purchase', or the like, and the second user 3 may be referred to as 'actual payer', 'actual purchaser', 'consignor of purchase', or the like. Meanwhile, there may be a plurality of second users.

The terminal device 200 of the first user 2 and the terminal device 300 of the second user 3 are terminal devices owned and used by the first user 2 and the second user 3 respectively, and may be smart phone, laptop computer, tablet, phablet, personal digital assistant (PDA), smart watch, moving picture experts group phase 1 or phase 2 (MPEG-1 or MPEG-2) audio layer 3 (MP3) player, or the like, but not limited thereto.

The server 100 provides agency payment service according to various embodiments of the present disclosure to be described below. To this purpose, the server 100 may provide an agency payment application that is installed and run on the terminal devices 200, 300 of the users 2, 3. Accordingly, the first user 2 and the second user 3 may access the server 100 or an application providing server (e.g., play store, app store, or the like) and install the agency payment application on their terminal devices 200, 300, execute and manipulate the installed agency payment application such that the agency payment service provided by the server 100 may be used.

Further, the server 100 may register the users 2, 3 subscribed to the agency payment service. For example, the first user 2 and the second user 3 may access the web pages provided by the server 100 through the agency payment application installed on their terminal devices 200, 300 to subscribe to the agency payment service provided by the server 100, and the server 100 may register the users subscribed to the service. In an example, various information items with respect to the users 2, 3 may be stored in the server 100 during registration.

Various embodiments will be described below by assuming that the first user 2 and the second user 3 are members of the agency payment service provided by the server 100, and the terminal device 200 of the first user 2 and the terminal device 300 of the second user 3 are installed with the agency payment application provided by the server 100, unless it is specifically mentioned herein about the subscription or non-subscription to the agency payment service of the first or second user 2, 3 or the presence or absence of the agency payment application installed on the terminal devices 200, 300.

The first user 2 may first request the second user 3 for an approval for the agency payment before making a payment according to the contract agreed with the second user 3 and makes the payment when such request is approved so that the first user 2 receives the payment from the second user 3 simultaneously upon making the payment.

Specifically, the first user 2 may transmit a request for agency payment approval to the server 100 through the agency payment application installed on the terminal device 200. In an example, the request for agency payment approval may include various information items associated with the agency payment, such as account information of the first user 2 to which repayment for the advance payment is to be transferred, information of the second user 3 whose approval is requested, an expected payment amount, or the like.

In response to receiving a request for agency payment approval from the terminal device 200 of the first user 2, the server 100 generates a message inquiring about approval or disapproval for the request for agency payment approval by using various information items included in the request for agency payment approval and transmits the generated message to the terminal device 300 of the second user 3.

In response to receiving the message inquiring about approval or disapproval from the server 100, the terminal device 300 of the second user 3 may execute the agency payment application to display the received message, and when the second user 3 approves the approval request of the first user 2, transmit the approval including the account information of the second user 3 to the server 100.

In response to receiving an approval from the terminal device 300 of the second user 3, the server 100 may generate an approval message indicating that the approval request of the first user 2 is approved, and transmit the generated message to the terminal device 200 of the first user 2. Accordingly, when the approval message is displayed on the terminal device 200 of the first user 2, the first user 2 may confirm the approval of the request for agency payment approval, and make the payment according to the contract with the second user 3 by using various payment means.

When the first user 2 makes the payment according to the contract with the second user 3, the server 100 may receive the payment information of the first user 2 through a financial transaction server 400 associated with the payment of the first user 2, generate account transfer information for requesting remittance from an account of the second user 3 to an account of the first user 2, and transmit the generated information to the financial transaction server 500 associated with the account of the second user 3.

Therefore, the financial transaction server 500 associated with the account of the second user 3 conducts account transfer according to the account transfer information received from the server 100 such that the first user 2 is repaid a payment from the second user 3 simultaneously upon making the payment according to the agency payment contract with the second user 3.

Figure 2:
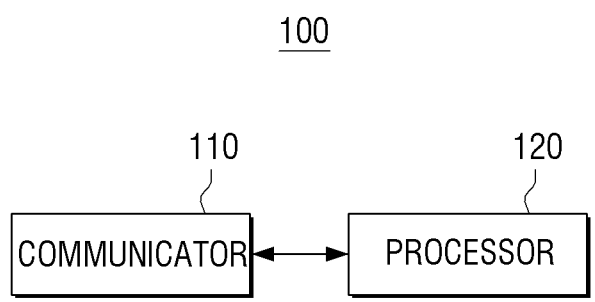
FIG. 2 is a block diagram of a server according to an embodiment of the present disclosure.
Figure 3:
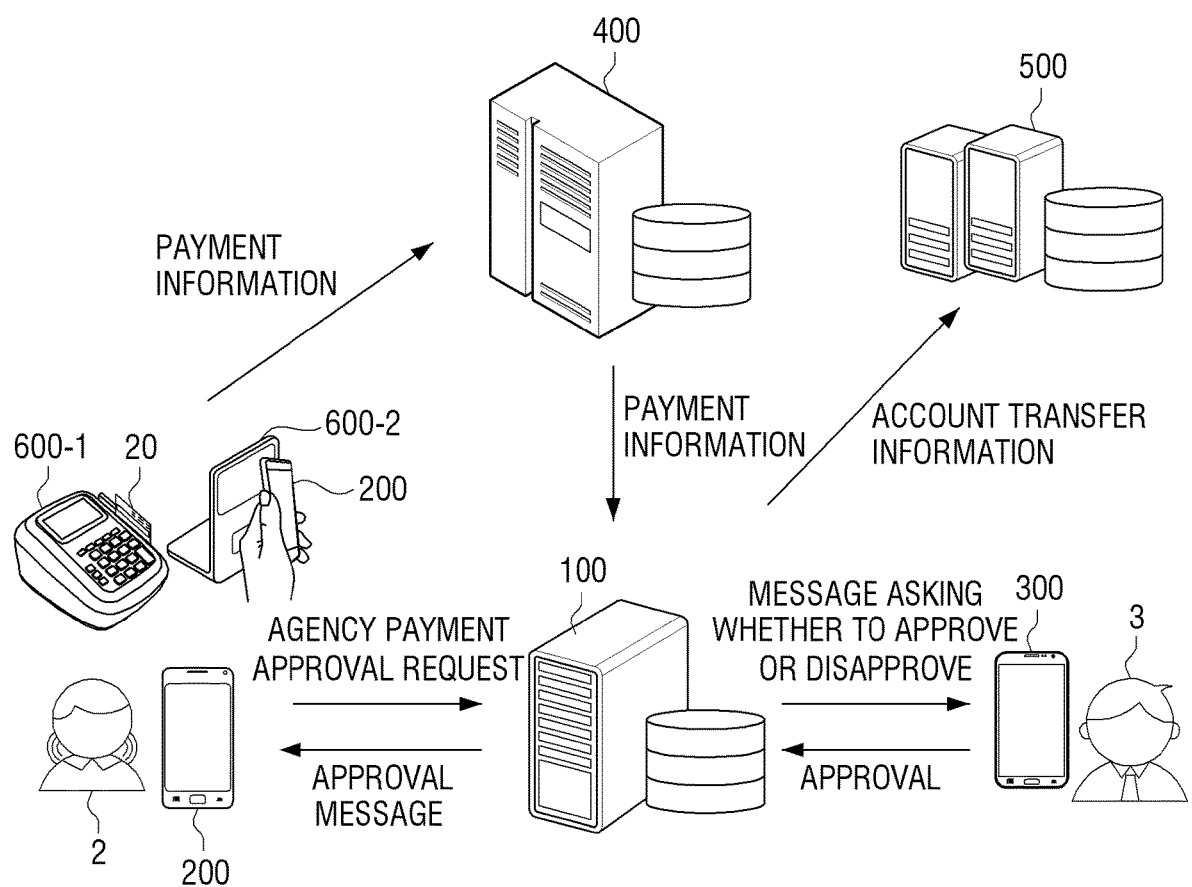
FIG. 3 is an illustration of an operation of an agency payment system according to an embodiment of the present disclosure.
Figure 4:
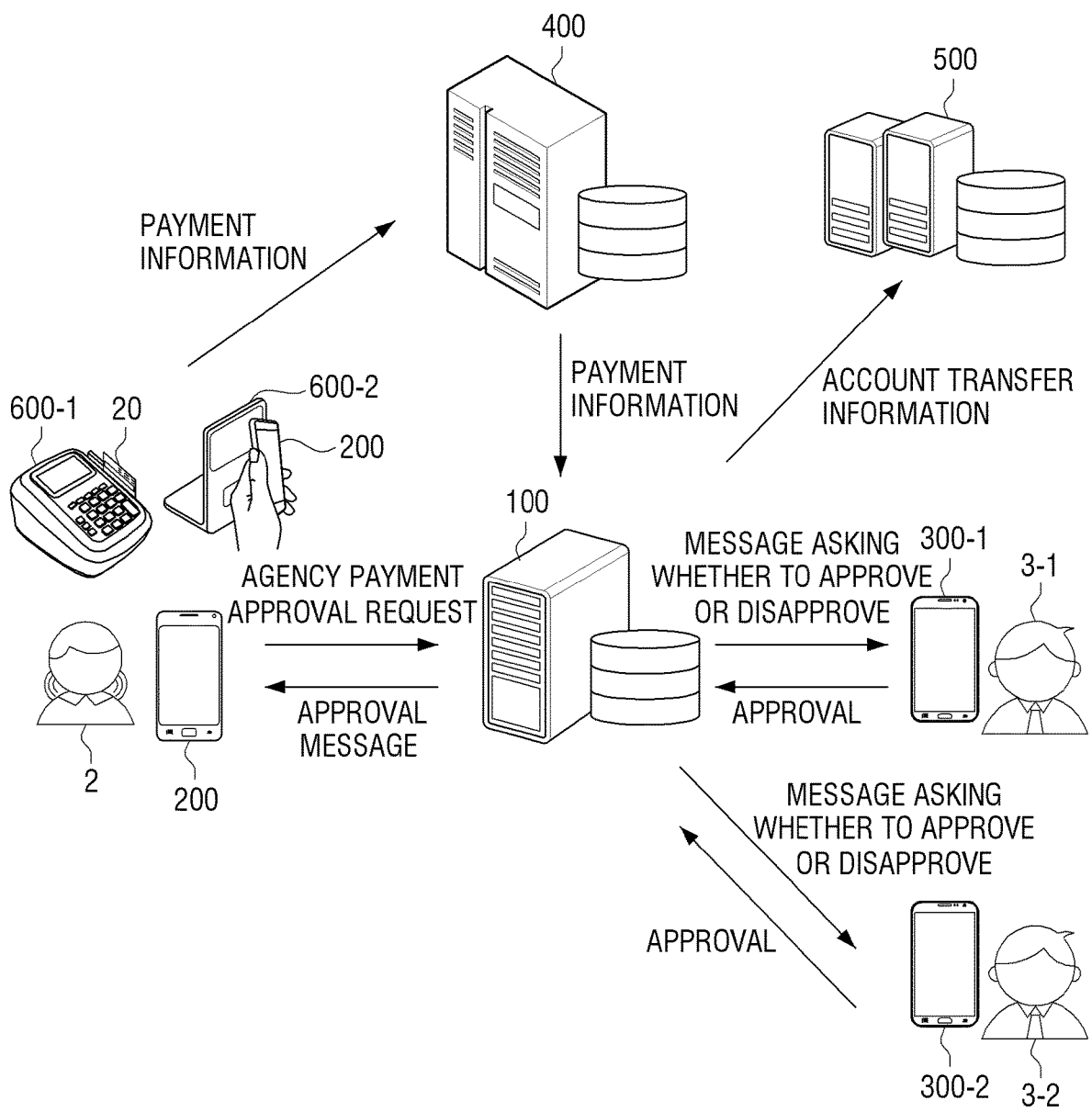
FIG. 4 is an illustration of an operation of an agency payment system according to an embodiment of the present disclosure.

The following will specifically describe various embodiments in which the server 100 provides the agency payment services by referring to FIGS. 2, 3, and 4. FIG. 2 is a block diagram of the server 100 according to an embodiment of the present disclosure.

FIG. 2 is a block diagram of a server according to an embodiment of the present disclosure.

Referring to FIG. 2, the server 100 includes a communicator 110 and a processor 120.

The communicator 110 may perform communication with an external terminal device or another server through various wiry and wireless networks. To this purpose, the communicator 110 may include wiry and wireless communication modules according to various communication methods. Specifically, the communicator 110 may include at least one of the wire communication module (not illustrated) according to communication standards, such as high-definition multimedia interface (HDMI), universal serial bus (USB), Institute of Electrical and Electronics Engineers (IEEE) 1394, recommend standard (RS-232), RS-422, RS-485, and Ethernet. Further, the communicator 110 may include a wireless communication module (not illustrated), such as wireless local access network (LAN) communication module (not illustrated) or mobile communication module (not illustrated). In an example, the wireless LAN communication module (not illustrated) is a module connected with external networks according to wireless communication protocols, such as Wi-Fi, IEEE, WiBro, or the like, to perform communication, and the wireless communication module is a module connected with the mobile communication network according to various mobile communication standards, such as 3rd generation (3G), 3rd Generation Partnership Project (3GPP), long term evolution (LTE), or the like, to perform communication.

Specifically, the communicator 110 in communication with the terminal devices 200, 300 of the first and second users 2, 3 and the financial transaction servers 400, 500 of the first and second users 2, 3 under the control of the processor 120 may transmit and receive various information items. In an example, the financial transaction servers 400, 500 associated with the first and second users may include a financial transaction server 400 associated with payment of the first user 2 and a financial transaction server 500 associated with an account of the second user 3, although not limited thereto. The financial transaction server 400 associated with payment of the first user 2 may be value added network (VAN) server, payment gateway (PG) server, credit card company server, transaction bank server, transaction securities company server of the first user 2, or the like, and the financial transaction server 500 associated with an account of the second user 3 may be transaction bank server, transaction securities company server, or the like, of the second user 3.

Meanwhile, as described above in FIG. 1, the server 100 may provide the agency payment application, which is installed on the terminal devices 200, 300 of the users 2, 3 registered to the server 100 to use the agency payment service and provides the agency payment service to the users 2, 3 according to various embodiments. To this purpose, the communicator 110 may perform communication with an external application providing server (not illustrated), such as app store, play store, or the like, and upload the agency payment application to the application providing server (not illustrated) or update the same. Further, the communicator 110 may transmit the agency payment application to the terminal devices 200, 300 of the users accessing the server 100 through web pages that can provide the agency payment application.

The storage (not illustrated) may store various information items, data and programs for the operation of the server 100 to be described below. To this purpose, the storage (not illustrated) may be implemented as random access memory (RAM), read only memory (ROM), flash memory, hard disk drive (HDD), solid state drive (SSD), or the like, but the embodiments may not be limited thereto.

The processor 120 may control the overall operation of the server 100. To this purpose, the processor 120 may include one or more of central processing unit (CPU), controller, application processor (AP), communication processor (CP), and ARM processor.

Specifically, the processor 120 may provide the agency payment service according to various embodiments of the present disclosure. In an example, the 'agency payment service' provided by the server 100 refers to a service that enables transfer of the entire or partial payment from an account of an actual payer simultaneously as an agent payer makes a payment, when the agent payer requests the agency payment approval to the actual payer and receives an approval before the agent payer makes an advance payment for goods according to an agency payment contract between the agent payer and the actual payer.

To this purpose, the processor 120 may register the users subscribed to the agency payment service to the server 100 and provide the agency payment service to the registered users. In an example, the processor 120 may match information of the users subscribed to the service with respective users and store the result in the storage (not illustrated). For example, the processor 120 may store user information based on user identification information, such as identifiers (IDs), names, telephone numbers of the users 2, 3, terminal device 200, 300 identification information of the users 2, 3, such as media access control (MAC) addresses, serial numbers, or the like, identification information of the agency payment application installed on the terminal devices 200, 300 of the users 2, 3, or the like, although not limited thereto.

The operation of the processor 120 according to various embodiments will be described below by referring to FIG. 3.

FIG. 3 is an illustration of an operation of an agency payment system according to an embodiment of the present disclosure.

Referring to FIG. 3, when a request for agency payment approval is received from the terminal device 200 of an agent payer (i.e., first user 2) through the communicator 110, the processor 120 may control the communicator 110 to transmit a message inquiring about approval or disapproval on a request for agency payment approval to the terminal device 300 of an actual payer (i.e., second user 3). In an example, the request for agency payment approval may include information of the second user 3 to whom agency payment approval is to be requested, expected payment information of the agency payment, i.e., the amount of advance payment to be paid by the first user 2 to purchase goods according to the agency payment contract between the first user 2 and the second user 3, and account information of the first user 2 to receive repayment from the second user 3 when the first user 2 makes the payment.

Specifically, in response to receiving a request for agency payment approval from the terminal device 200 of the first user 2, the processor 120 may determine whether the first user 2 and the second user 3 are registered to the server 100.

For example, the processor 120 may identify the terminal device 200 by using device identification information exchanged during a communication process according to communication method between the server 100 and the terminal device 200. In other words, the request for agency payment approval transmitted by the terminal device 200 to the server 100 may be added or provided with identification information of the terminal device 200 according to communication method between the terminal device 200 and the server 100, and the processor 120 may identify the terminal device 200 that transmits a request for agency payment approval by using the identification information. The processor 120 may compare information of the identified terminal device 200 with information of the user stored in the storage (not illustrated) to determine whether the first user 2 is registered to the server 100.

However, a method of the processor 120 for determining whether the first user 2 is registered is not limited above. For example, the terminal device 200 of the first user 2 may transmit a request for agency payment approval including information of the first user 2 (e.g., first user 2 identification information, terminal device 200 identification information, identification information of the agency payment application installed on the terminal device 200, or the like) or transmit a request for agency payment approval including the first user 2 information. Further, the processor 120 may compare the received first user 2 information with the user information stored in the storage (not illustrated) to determine whether the first user 2 requesting an agency payment approval is registered to the server 100.

Meanwhile, the processor 120 may compare information of the second user 3 included in the request for agency payment approval (specifically, user identification information, but not limited thereto) with the user information stored in the storage (not illustrated) to determine whether the second user 3 is registered to the server 100.

Accordingly, when the first user 2 and the second user 3 are determined to be the registered users, the processor 120 may generate a message inquiring about approval or disapproval on a request for agency payment approval by using various information items included in the request for agency payment approval and the information of the first and second users 2, 3 stored in the storage (not illustrated). In an example, the message inquiring about approval or disapproval may include information on the first user 2 requesting an approval on the agency payment (e.g., user identification information, but not limited thereto), expected payment information, information on a payment amount requiring approval of the second user 3, or the like.

Meanwhile, according to an embodiment of the present disclosure, the request for agency payment approval may further include information of the goods for which payment is intended to be made by the first user 2, information of online or offline shops selling corresponding goods, information of an expected payment time, or the like, and the processor 120 may generate a message inquiring about approval or disapproval that may further include such information included in the request for agency payment approval.

The following will specifically explain a method for calculating a payment amount requiring an approval of the second user 3 included in the message inquiring about approval or disapproval according to various embodiments.

The agency payment contract between the first user 2 and the second user 3 may include a contract ('first type contract') according to which the first user 2 has no responsibility on the advance payment he or she made and thus the first user 2 receives the entire payment from the second user 3, and another contract ('second type contract') according to which the first user 2 has a partial responsibility on the advance payment he or she made and thus the first user 2 receives only the partial payment for which the second user 3 is responsible.

For example, one example of the first type contract may include a situation in which the second user 3 asks the first user 2 to purchase a book under the condition of repaying a payment later and the first user 2 agrees to do so. Under this contract, the first user 2 may receive the entire advance payment he or she made to purchase a book from the second user 3. Meanwhile, an example of the second type contract may include a situation in which each of the first user 2 and the second user 3 agrees to share the half of the cost for the dinner under the condition that the first user 2 makes an advance payment for the entire price such that the share of the second user 3 for payment is paid by the first user 2 by agency payment on behalf of the second user 3, and the first user 2 receives repayment for the shared responsibility of the second user 3 except for his shared responsibility.

Accordingly, depending on types of the agency payment contract described above, the payment amount requiring the approval of the second user 3 may be varied even when the expected payment amount is same. Therefore, in order to provide the agency payment service based on the type of the agency payment contract, the processor 120 may calculate a payment amount requiring an approval of the second user 3 by using the information included in the request for agency payment approval with various methods to be described below.

Specifically, according to an embodiment of the present disclosure, the request for agency payment approval received from the terminal device 200 of the first user 2 may further include mode information as well as information of the second user 3 and information of the expected payment. The mode information may include information indicating one of a first mode (corresponding to the first type contract described above) in which the second user 3 bears all of the expected payment, and a second mode (corresponding to the second type contract) in which the first user 2 and the second user 3 share the responsibility of the expected payment.

In this case, when the mode information included in the request for agency payment approval is the first mode, the processor 120 may calculate a payment amount requiring an approval of the second user 3 by dividing the expected payment by the total number of the second users 3, and when the mode information is the second mode, the processor 120 may calculate a payment amount requiring an approval of the second user by dividing the expected payment by the total number of the first user 2 and the second user 3.

For example, when the expected payment is 30,000 KW and the mode information is the first mode, the processor 120 may calculate a payment amount requiring an approval of the second user 3 by dividing the expected payment (30,000 KW) by the total number (1) of the second users, i.e., by dividing 30,000 KW by 1, which gives 30,000 KW. Meanwhile, when the expected payment is 30,000 KW and the mode information is the second mode, the processor 120 may calculate a payment amount requiring an approval of the second user 3 by dividing the expected payment (i.e., 30,000 KW) by the total number (i.e., 2) of the first user 2 and the second user, i.e., by dividing 30,000 KW by 2, which gives 15,000 KW.

Meanwhile, according to another embodiment of the present disclosure, even when the request for agency payment approval does not include separate mode information, the processor 120 may determine one of the first mode or the second mode according to whether information of the first user 2 is included as the information of a user who will bear the expected payment.

In other words, when the request for agency payment approval does not include the first user 2 information as the information of a user who will bear the expected payment, the first user 2 does not have a responsibility on the expected payment, and accordingly, the processor 120 may determine the current mode to be the first mode. Conversely, when the request for agency payment approval includes the first user 2 information as the information of a user who will bear the expected payment, the first user 2 has a responsibility on the expected payment, and accordingly, the processor 120 may determine the current mode to be second mode. Operation of the processor 120 after determining a mode is already described above.

Meanwhile, according to another embodiment of the present disclosure, the request for agency payment approval received from the terminal device 200 of the first user 2 may include information regarding the number of users who share the responsibility of the expected payment. In this case, the processor 120 may calculate a payment amount requiring an approval of the second user 3 by dividing the expected payment by the number of the users who share the responsibility of the payment.

For example, when the expected payment is 30,000 KW and the number of the users to share responsibility is 1 (as in an example in which the first user 2 and the second user 3 agreed upon the first type contract), the processor 120 may calculate a payment amount requiring an approval of the second user 3 by dividing the expected payment (30,000 KW) by 1, which gives 30,000 KW. Meanwhile, when the expected payment is 30,000 KW and the number of the users to share responsibility is 2 (as in an example in which the first user 2 and the second user 3 agreed upon the second type contract), the processor 120 may calculate a payment amount requiring an approval of the second user 3 by dividing the expected payment (30,000 KW) by 2, which gives 15,000 KW.

Meanwhile, according to another embodiment of the present disclosure, the request for agency payment approval received from the terminal device 200 of the first user 2 may include share information. The share information may include information on ratios of payment of the first user 2 and the second user 3 with respect to the expected payment, or information on the shares of payment of the expected payment of the first user 2 and the second user 3. In this case, the processor 120 may calculate the payment amount requiring an approval of the second user 3 by dividing the expected payment according to the share information.

Specifically, when the share information is a ratio to share the expected payment, the processor 120 may calculate a shared responsibility of the first user 2 and a shared responsibility of the second user 3 of the expected payment based on the ratio, and calculate the payment amount requiring an approval of the second user 3 based on the shared responsibility of the second user 3.

For example, when the expected payment is 30,000 KW and the ratio is 0:1 (as in an example in which the first user 2 and the second user 3 agreed upon the first type contract), the processor 120 may calculate a shared responsibility of the first user 2 to be 0 KW, and a shared responsibility of the second user 3 to be 30,000 KW, and calculate a payment amount requiring an approval of the second user 3 to be 30,000 KW.

Meanwhile, when the expected payment is 30,000 KW and the ratio is 1:1 (as in an example in which the first user 2 and the second user 3 agreed upon the second type contract), the processor 120 may calculate a shared responsibility of the first user 2 and a shared responsibility of the second user 3 to be 15,000 KW, respectively, and calculate a payment amount requiring an approval of the second user 3 to be 15,000 KW based on the shared responsibility of the second user 3. The ratio of 1:1 is exemplified for convenience of explanation, and the various embodiments are not limited thereto. Accordingly, any ratio may be used.

Meanwhile, when the share information is each user's shared payment in the expected payment, the processor 120 may calculate the shared amount corresponding to the second user 3 to be the payment amount requiring an approval of the second user 3. For example, when the expected payment is 30,000 KW and the shared responsibility is 0 KW for the first user 2 and 30,000 KW for the second user 3, the processor 120 may calculate 30,000 KW to be the payment amount requiring an approval of the second user 3. Meanwhile, when the expected payment is 30,000 KW and a shared responsibility is 15,000 KW for the first user 2 and 15,000 KW for the second user 3, the processor 120 may calculate 15,000 KW to be the payment amount requiring an approval of the second user 3. In this case, the shared responsibility may also be varied from the examples provided above.

As described above, when a payment amount requiring an approval of the second user 3 is calculated according to various embodiments of the present disclosure, the processor 120 may generate a message inquiring about approval or disapproval which includes the calculated payment amount requiring an approval of the second user 3.

When a message inquiring about approval or disapproval on the request for agency payment approval is generated, the processor 120 may control the communicator 110 to transmit the generated message to the terminal device 300 of the second user 3. As described above, because the request for agency payment approval includes information of the second user 3 (e.g., ID or name of the second user 3, but not limited thereto), the processor 120 may transmit the generated message to the terminal device 300 of the second user 3 by using the information of the second user 3 stored in the storage (not illustrated) (e.g., telephone number or identification information of the terminal device 300, but not limited thereto).

According to an embodiment of the present disclosure, when a telephone number or the identification information of the terminal device 300 is included in the second user 3 information of the request for agency payment approval, the processor 120 may transmit the generated message to the terminal device 300 of the second user 3 by using the information included in the request for agency payment approval, rather than using the information stored in the storage (not illustrated).

Meanwhile, when a request for agency payment approval is received from the terminal device 200 of the first user 2, the processor 120 may temporarily store the account information of the first user 2 included in the request for agency payment approval in the storage (not illustrated). The account information of the first user 2 may be the information encrypted through the agency payment application installed on the terminal device 200, and the processor 120 may decrypt the encrypted account information of the first user 2 and use the same as need arises. In an example, an encrypting and decrypting method may not be limited. Meanwhile, the account information of the first user 2 may be deleted from the storage (not illustrated) after a specific payment is transferred to an account of the first user 2 from an account of the second user 3, which will be further described below.

The message inquiring about approval or disapproval on the request for agency payment approval transmitted to the terminal device 300 of the second user 3 may be displayed on the terminal device 300 of the second user 3, and accordingly, the second user 3 may approve or may not approve the request for agency payment approval.

When the request for agency payment approval is approved by the second user 3, the communicator 110 may receive an approval for the request for agency payment approval including the account information of the second user 3 from the terminal device 300 of the second user 3.

In response to receiving an approval for the request for agency payment approval, the processor 120 may temporarily store the account information of the second user 3 in the storage (not illustrated). The account information of the second user 3 may be the encrypted information, and the processor 120 may decrypt the encrypted account information of the second user 3 and use the same as need arises. In an example, an encrypting and decrypting method may not be limited. Meanwhile, after a specific amount of payment is transferred to the account of the first user 2 from the account of the second user 3, the account information of the second user 3 may be deleted from the storage (not illustrated).

Further, in response to receiving an approval for the request for agency payment approval from the terminal device 300 of the second user 3, the processor 120 may generate an approval message with respect to the agency payment request and transmit the generated message to the terminal device 200 of the first user 2.

In an example, the approval message may include information indicating that the request for agency payment approval made by the first user 2 is approved. For example, the approval message may include information indicating that the expected payment or the payment amount requiring an approval of the second user 3 is approved by the second user 3, although not limited thereto.

In response to receiving the approval message, the terminal device 200 of the first user 2 may display the approval message, and accordingly, the first user 2 may confirm that the request for agency payment approval of the first user 2 is approved by the second user 3.

Meanwhile, the first user 2 confirming that the agency payment request is approved may make payment through various payment means, and the payment information about the payment made by the first user 2 may be received at the communicator 110 through the financial transaction server 400 associated with payment of the first user 2.

For example, when the first user 2 purchases goods according to the agency purchasing contract at an offline shop and pays the price by using a card, the payment information may be transmitted to the VAN server and the card company server, and the communicator 110 may receive the payment information of the first user 2 from the VAN server or the card company server.

In an example, as illustrated in FIG. 3, the method for making a payment using a card includes not only an example in which the first user 2 directly swipes his or her credit card 20 through a payment terminal device 600-1, but also an example in which the first user 2 pays with a credit card using the terminal device 200. In other words, even when the terminal device 200 of the first user 2 makes payment in a communication with a payment terminal device 600-2, the payment information may be transmitted to the VAN server and the card company server, and the communicator 110 may receive the account information of the first user 2 from the VAN server or the card company server.

For example, when the terminal device 200 is a smart phone, the first user 2 may install an app card app or mobile card app on the terminal device 200 of the first user 2, register a credit card to the installed app, and accordingly, use a credit card through the terminal device 200. For the app card method, bar code or quick response (QR) code corresponding to the credit card may be displayed as the user executes the app, and the payment terminal device 600-2 may read the bar code or the QR code, while processing the credit card payment. For the mobile card method, the credit card information is stored in universal subscriber identity module (USIM) of a smart phone or the credit card is registered to the installed app, and the app is executed to tag the terminal device 200 to the payment terminal device 600-2.

Meanwhile, when the first user 2 purchases goods according to the agency purchasing contract at an online shop and pays the price, the payment information may be transmitted to a PG server, a bank server or a credit card company server, and the communicator 110 may receive the payment information of the first user 2 from the PG server, the bank server or the credit card company server.

Even when there is no separate request from the server 100, the financial transaction server 400 receiving the payment information of the first user 2 may automatically transmit the payment information of the first user 2 to the server 100 or transmit the payment information upon request of the server 100. The above may be varied according to a contract between an operator of the financial transaction server 400 and an operator of the server 100.

As described above, when the payment information of the first user 2 with respect to the agency payment is received through the communicator 110, the processor 120 may generate account transfer information for requesting remittance from an account of the second user 3 to an account of the first user 2, and transmit the generated account transfer information to the financial transaction server 500 associated with the account of the second user.

Specifically, in response to receiving the payment information, the processor 120 may compare the payment information received from the financial transaction server 400 associated with the payment of the first user 2 with various information included in the request for agency payment approval of the first user 2 to determine presence or absence of a request for agency payment approval corresponding to the payment information.

The processor 120 may temporarily store the request for agency payment approval received from the terminal device 200 of the first user 2 in the storage (not illustrated). Accordingly, the storage (not illustrated) may store each request for agency payment approval of the users using the agency payment service.

Meanwhile, the request for agency payment approval may include information associated with goods to be paid by the first user 2, information associated with online or offline shops selling corresponding goods, information associated with expected payment time, or the like, as well as account information of the first user 2, information associated with the second user 3, and expected payment information. The payment information may include information associated with payment means (e.g., credit card information, or the like), information associated with a paid price, information associated with a shop being paid, information associated with goods to be paid, information associated with payment time, or the like.

Accordingly, the processor 120 may compare various information included in the payment information with various information included in the request for agency payment approval to determine whether the request for agency payment approval corresponding to the payment information is present in a plurality of request for agency payment approvals stored in the storage (not illustrated).

When the result of determination reveals that the request for agency payment approval corresponding to the payment information is present, the processor 120 may generate account transfer information for requesting remittance from an account of the second user 3 to an account of the first user 2.

Specifically, when the expected payment included in the request for agency payment approval is same as the payment included in the payment information, the processor 120 may generate account transfer information in which a payment amount requiring an approval of the second user 3 is transferred from an account of the second user 3 to an account of the first user 2.

The payment amount requiring an approval of the second user 3 may be same as the payment amount requiring an approval of the second user 3 included in the message inquiring about approval or disapproval described above, and therefore, it will not be further described below. To provide an example for better understanding, in an embodiment in which the mode information is included in the agency payment request, as described above, a payment amount requiring an approval of the second user 3 may be obtained by dividing the expected payment by the total number of the second users 3 when the mode information is the first mode, or obtained by dividing the expected payment by the total number of the first user 2 and the second user 3 when the mode information is the second mode. Accordingly, when the first user 2 pays a payment same as the expected payment, the processor 120 may generate account transfer information in which such payment amount is transferred from an account of the second user 3 to an account of the first user 2.

Meanwhile, when the expected payment included in the request for agency payment approval is different from the payment amount included in the payment information, the processor 120 may generate account transfer information in which lesser of the payment amount requiring an approval of the second user 3 and the payment amount is transferred from an account of the second user 3 to an account of the first user 2.

This is because a payment amount requiring an approval of the second user 3 is calculated by various methods described above based on the expected payment, and also the second user 3 confirms the payment amount requiring an approval through the message inquiring about approval or disapproval and approves the request for agency payment approval for that amount. This is also because it would be unfair if the payment of the first user 2 is less than the payment included in the message inquiring about approval or disapproval (i.e., payment amount requiring an approval of the second user 3) because in this case, the first user 2 would receive more payment than he or she actually paid.

Meanwhile, when the first user 2 requests an agency payment approval to the second user 3 and receives an approval, but expects that the payment to be actually paid later is different from the expected payment amount approved (More particularly, when the expected payment increases), the first user 2 may request an approval of the second user 3 for a new agency payment with a modified expected payment before making payment.

The processor 120 may control the communicator 110 to transmit the generated account transfer information described above to the financial transaction server 500 associated with an account of the second user 3, e.g., to a bank server managing an account of the second user 3. Accordingly, in response to receiving the account transfer information, the financial transaction server 500 associated with an account of the second user 3 may perform account transfer based on the received account transfer information, and therefore, the first user 2 may receive the payment from the second user 3 simultaneously upon making payment according to the agency payment contract.

Finally, when the agency payment service of the server 100 with respect to the request for agency payment approval of the first user 2 is completed, the processor 120 may delete the information temporarily stored in the storage (not illustrated) with respect to the completed agency payment service.

Specifically, when the account transfer is finished based on the account transfer information, the financial transaction server 500 associated with an account of the second user 3 may transmit a message indicating that account transfer is completed to the server 100. Accordingly, when the message indicating that account transfer is completed is received through the communicator 110, the processor 120 may delete the request for agency payment approval of the first user 2, the account information of the first user 2, the account information of the second user 3, the payment information of the first user 2, or the like, which are temporarily stored in the storage (not illustrated).

Meanwhile, the above exemplifies and describes that an actual payer, i.e., the second user 3 is one person. However, with respect to both the first type contract and the second type contract described above, the second user may include a plurality of second users. In other words, for example, when the second user I and the second user II entrust the first user 2 to purchase a book under the condition in which the corresponding payment will be repaid later and the first user 2 agrees with the above, this may correspond to the example of the first type contract in which there are a plurality of second users, and the first user 2 may receive the entire payment of purchasing the book from the second user I and the second user II because he has no shared responsibility. Meanwhile, when the first user 2, the second user I and the second user II agree to each bear a third of the dinning cost and the first user 2 first pays the entire payment for the dinning on behalf of the others, the first user 2 who paid the entire payment of the dinning cost on behalf of the others may receive from the second user I and the second user II only the payments according to their shared responsibilities, and the above may apply as an example of the second type contract in which there are a plurality of second users because the first user 2 has a shared responsibility.

The following will describe operation of the processor 120 according to various embodiments when there are two or more second users by referring to FIG. 4.

FIG. 4 is an illustration of an operation of an agency payment system according to an embodiment of the present disclosure.

Referring to FIG. 4, there are two second users 3-1, 3-2 for convenience of description. However, a person skilled in the art may obviously understand that the following embodiments are similarly applicable to a case in which there are two or more second users.

Meanwhile, FIG. 4 is same as FIG. 3 except that there are two second users. In an embodiment of FIG. 4, operation of the processor 120 in FIG. 3 may be uniformly applied except for the modifications that may occur according to a change from one second user to a plurality of the second users. Accordingly, when explaining FIG. 4 below, the operations or elements overlapping with FIG. 3 will not be redundantly provided, while only the difference from FIG. 3 due to inclusion of a plurality of second users will be mainly described.

Referring to FIG. 4, the first user 2 under the agency payment contract with the second user 3-1 and the second user 3-2 may request an agency payment approval by using the terminal device 200 of the first user 2. Accordingly, when the request for agency payment approval is received through the communicator 110 from the terminal device 200 of the first user 2, the processor 120 may control the communicator 110 to transmit a message inquiring about approval or disapproval on the request for agency payment approval to the terminal device 300-1 of the second user 3-1 and the terminal device 300-2 of the second user 3-2. In an example, the request for agency payment approval may include information associated with the second user 3-1 and the second user 3-2, expected payment information, and account information of the first user 2.

Specifically, when a request for agency payment approval is received from the terminal device 200 of the first user 2, the processor 120 may determine whether the first user 2, the second user 3-1, and the second user 3-2 are registered to the server 100. A method of the processor 120 for determining whether each user is registered to the server 100 is already described above.

Accordingly, when the first user 2 and the second user 3 are determined to be the registered users, the processor 120 may generate a message inquiring about approval or disapproval on a request for agency payment approval by using various information items included in the request for agency payment approval and the information of the first and second users 2, 3 stored in the storage (not illustrated).

For example, the processor 120 may generate a message inquiring about approval or disapproval to be transmitted to the second user 3-1, and a message inquiring about approval or disapproval to be transmitted to the second user 3-2, respectively. The messages inquiring about approval or disapproval, which are transmitted respectively to the second users 3-1, 3-2, may include the information associated with a payment amount requiring an approval of the second users 3-1, 3-2 respectively. According to an embodiment of the present disclosure, the messages inquiring about approval or disapproval may further include information associated with the first user 2 (e.g., user identification information, but not limited thereto), expected payment information, information associated with goods to be paid by the first user 2, information associated with online or offline shops selling corresponding goods, information associated with expected payment time, or the like.

However, the embodiments may not be limited to the above, and accordingly, the processor 120 may generate one message inquiring about approval or disapproval which is transmitted to the second user 3-1 and the second user 3-2. The one message inquiring about approval or disapproval should include both the information associated with a payment amount requiring an approval of the second user 3-1 and the information associated with a payment amount requiring an approval of the second user 3-2.

The following will specifically describe various embodiments in which a payment amount requiring an approval of each of the second users is calculated when there are a plurality of second users.

As described above, depending on the type of the agency payment contract, a payment amount requiring an approval may be varied between the second users 3-1, 3-2 even when the expected payment is same. Therefore, in order to provide the agency payment service based on the type of the agency payment contract, the processor 120 may calculate a payment amount requiring an approval of the plurality of second users 3-1, 3-2 by using the information included in the request for agency payment approval with various methods to be described below.

Specifically, as described above, when the request for agency payment approval received from the terminal device 200 of the first user 2 further includes the mode information, the processor 120 may calculate payment amount requiring an approval of the second users 3-1, 3-2 by using the expected payment, the information associated with the second users 3-1, 3-2, and the mode information.

Accordingly, when the mode information included in the request for agency payment approval is the first mode, the processor 120 may calculate a payment amount requiring an approval of the second user 3 by dividing the expected payment by the total number of the second users 3, and when the mode information is the second mode, the processor 120 may calculate a payment amount requiring an approval of the second user by dividing the expected payment by the total number of the first user 2 and the second user 3.

For example, when the expected payment is 30,000 KW and the mode information is the first mode, the processor 120 may calculate a payment amount requiring an approval of the second user 3-1 and a payment amount requiring an approval of the second user 3-2 by dividing the expected payment (30,000 KW) by the total number (2) of the second users, i.e., by dividing 30,000 KW by 2, which gives 15,000 KW.

Meanwhile, when the expected payment is 30,000 KW and the mode information is the second mode, the processor 120 may calculate a payment amount requiring an approval of the second user 3-1 and a payment amount requiring an approval of the second user 3-2 by dividing the expected payment (i.e., 30,000 KW) by the total number (i.e., 3) of the first user 2 and the second users 3-1, 3-2, i.e., by dividing 30,000 KW by 3, which gives 10,000 KW.

Meanwhile, as described above, in another embodiment of the present disclosure, even when the request for agency payment approval does not include separate mode information, the processor 120 may determine one of the first mode or the second mode according to whether information of the first user 2 is included as the information of a user who will bear the expected payment.

In other words, the processor 120 may determine the current mode to be the first mode when the request for agency payment approval does not include the first user 2 information as information of a user who will bear the expected payment, or otherwise, the processor 120 determine the second mode. Operation of the processor 120 after determining a mode is already described above.

Further, as described above, according to another embodiment of the present disclosure, the request for agency payment approval received from the terminal device 200 of the first user 2 may include information regarding the number of users who share the responsibility of the expected payment. In this case, the processor 120 may calculate a payment amount requiring an approval of the second user 3 by dividing the expected payment by the number of the users who share the responsibility of the payment.

For example, when the expected payment is 30,000 KW and the number of the users to share responsibility is 2 (as in an example in which the first user 2 and two second users 3-1, 3-2 agreed upon the first type contract), the processor 120 may calculate a payment amount requiring an approval of the second user 3-1 and a payment amount requiring an approval of the second user 3-2 by dividing the expected payment (30,000 KW) by 2, which gives 15,000 KW.

Meanwhile, when the expected payment is 30,000 KW and the number of the users to share responsibility is 3 (as in an example in which the first user 2 and the second users 3-1, 3-2 agreed upon the second type contract), the processor 120 may calculate a payment amount requiring an approval of the second user 3-1 and a payment amount requiring an approval of the second user 3-2 by dividing the expected payment (30,000 KW) by 3, which gives 10,000 KW.

Meanwhile, as described above, according to another embodiment of the present disclosure, the request for agency payment approval received from the terminal device 200 of the first user 2 may include share information. The share information may include information on ratios of payment of the first user 2, and the second user 3-1 and the second user 3-2 with respect to the expected payment, or information on the shares of payment of the expected payment of the first user 2 and the second user 3-1 and the second user 3-2. In this case, the processor 120 may calculate the payment amount requiring an approval of the second user 3-1 and the payment amount requiring an approval of the second user 3-2 by dividing the expected payment according to the share information.

Specifically, when the share information is a ratio to share the expected payment, the processor 120 may calculate a shared responsibility of the first user 2, a shared responsibility of the second user 3-1, and a shared responsibility of the second user 3-2 for the expected payment based on the ratio, and calculate the payment amount requiring an approval of the second user 3-1 and the payment amount requiring an approval of the second user 3-2 based on the shared responsibilities of the second users 3-1, 3-2.

For example, when the expected payment is 30,000 KW and the ratio is 0:1:1 (as in an example in which the first user 2 and two second users 3-1, 3-2 agreed upon the first type contract), the processor 120 may calculate a payment amount requiring an approval of the second user 3-1 and a payment amount requiring an approval of the second user 3-2 to be 15,000 KW, respectively. Meanwhile, when the expected payment is 30,000 KW and the ratio is 1:1:1 (as in an example in which the first user 2 and two second users 3-1, 3-2 agreed upon the second type contract), the processor 120 may calculate a payment amount requiring an approval of the second user 3-1 and a payment amount requiring an approval of the second user 3-2 to be 10,000 KW, respectively.

Meanwhile, when the share information is each user's shared payment in the expected payment, the processor 120 may calculate the shared amount corresponding to the second user 3-1 and the second user 3-2 to be the payment amount requiring an approval of the second user 3.

For example, when the expected payment is 30,000 KW and a shared responsibility is 0 KW for the first user 2 and 15,000 KW for the second user 3-1 and 15,000 KW for the second user 3-2, the processor 120 may calculate 15,000 KW to be the payment amount requiring an approval of the second user 3-1 and the second user 3-2. Meanwhile, when the expected payment is 30,000 KW and a shared responsibility is 10,000 KW for the first user 2 and 10,000 KW for the second user 3-1 and 10,000 KW for the second user 3-2, the processor 120 may calculate 10,000 KW to be the payment amount requiring an approval of the second user 3-1 and the second user 3-2.

Meanwhile, although the above describes an example of the share information that calculates the same payment amount requiring an approval of the second user 3-1 and the second user 3-2, the embodiments may not be limited thereto. Accordingly, the information associated with a ratio or information associated with a shared responsibility of the payment can vary from the above embodiment.

As described above, when a payment amount requiring an approval of the second user 3 and the second user 3-2 is calculated according to various embodiments of the present disclosure, the processor 120 may generate a message inquiring about approval or disapproval which includes the payment amount requiring an approval of the second user 3-1 and payment amount requiring an approval of the second user 3-2 as calculated.

When a message inquiring about approval or disapproval on the request for agency payment approval is generated, the processor 120 may control the communicator 110 to transmit the generated message to the terminal device 300-1 of the second user 3-1 and the terminal device 300-2 of the second user 3-2, respectively, which has been described above by referring to FIG. 3.

Meanwhile, the message inquiring about approval or disapproval on the request for agency payment approval transmitted to the terminal devices 300-1, 300-2 of the second users 3-1, 3-2 may be displayed on the terminal devices 300-1, 300-2, respectively, and accordingly, the second user 3-1 and the second user 3-2 may approve or may not approve the request for agency payment approval.

When the request for agency payment approval is approved by the second user 3-1 and the second user 3-2, respectively, the communicator 110 may receive an approval for the request for agency payment approval including the account information of the second user 3-1 and an approval for the request for agency payment approval including the account information of the second user 3-2 from the terminal device 300-1 of the second user 3-1 and the terminal device 300-1 of the second user 3-2, respectively.

Accordingly, the processor 120 may temporarily store account information of the second user 3-1 and the account information of the second user 3-2 to the storage (not illustrated), respectively, and generate an approval message on the agency payment request and transmit the generated message to the terminal device 200 of the first user 2.

For example, in response to receiving the approvals from both the terminal devices 300-1, 300-2 of the second users 3-1, 3-2, the server 100 may generate one single approval message indicating that the approval request of the first user 2 is approved, and transmit the generated message to the terminal device 200 of the first user 2. Alternatively, according to an embodiment of the present disclosure, the server 100 may generate a message indicating request approval in an order of receiving the approvals from the terminal devices 300-1, 300-2 of the second users 3-1, 3-2 and transmit the generated message to the terminal device 200 of the first user 2.

In an example, the approval message may include information indicating that the expected payment or the payment amount requiring an approval of the second user 3 is approved by the second user 3, although not limited thereto.

The terminal device 200 of the first user 2 may display the approval message received from the server 100, and accordingly, the first user 2 may confirm that the request for agency payment approval of the first user 2 is approved by the second user 3-1 and/or the second user 3-2.

Meanwhile, the first user 2 confirming that the agency payment request is approved may make payment through various payment means, and the payment information about the payment made by the first user 2 may be received at the communicator 110 through the financial transaction server 400 associated with payment of the first user 2. Because this is already described above by referring to FIG. 3, it will not be further described below.

As described above, when the payment information of the first user 2 with respect to the agency payment is received through the communicator 110, the processor 120 may generate account transfer information for requesting remittance from an account of the second user 3-1 and an account of the second user 3-1 to an account of the first user 2, and transmit the generated account transfer information to the financial transaction server 500 associated with the accounts of the second user 3-1 and the second user 3-2, respective. Although FIG. 4 illustrates that the financial transaction server 500 associated with the accounts of the second user 3-1 and the second user 3-2 is the same server, the financial transaction servers may be also different from each other.

Specifically, when payment information is received, the processor 120 may compare the payment information with various information included in the request for agency payment approval of the first user 2 to determine whether there is a request for agency payment approval corresponding to the payment information. When the result of determination reveals that there is a request for agency payment approval corresponding to the payment information, the processor 120 may generate account transfer information for requesting remittance from an account of the second user 3-1 to an account of the first user 2 and account transfer information for requesting remittance from an account of the second user 3-2 to an account of the first user 2.

In an example, when the expected payment included in the request for agency payment approval is same as the payment included in the payment information, the processor 120 may generate account transfer information for transferring a payment amount requiring an approval of the second user 3-1 from the account of the second user 3-1 to the account of the first user 2 and account transfer information for transferring a payment amount requiring an approval of the second user 3-2 from the account of the second user 3-2 to the account of the first user 2.

Meanwhile, when the expected payment included in the request for agency payment approval is different from the payment amount included in the payment information, the processor 120 may generate account transfer information for transferring a lesser of the payment amount requiring an approval of the second user 3-1, 3-2 (i.e., sum of a payment amount requiring an approval of the second user 3-1 and a payment amount requiring an approval of the second user 3-2) and the payment from accounts of the second users 3-1, 3-2 to an account of the first user 2.

Specifically, when the payment exceeds the payment amounts requiring approvals of the second users 3-1, 3-2, the processor 120 may generate account transfer information for transferring a payment amount requiring an approval of the second user 3-1 from the account of the second user 3-1 to the account of the first user 2 and account transfer information for transferring a payment amount requiring an approval of the second user 3-2 from the account of the second user 3-2 to the account of the first user 2.

For example, when a payment amount requiring an approval of the second user 3-1 and a payment amount requiring an approval of the second user 3-2 are 10,000 KW, respectively, and the expected payment is 30,000 KW, and the payment made by the first user 2 exceeds 20,000 KW, since the payment made by the first user 2 is different from the expected payment and the payment exceeds 20,000 KW which is the payment amounts requiring an approval of the second users 3-1, 3-2, the processor 120 may generate account transfer information for transferring 10,000 KW from an account of the second user 3-1 to an account of the first user 2 and account transfer information for transferring 10,000 KW from an account of the second user 3-2 to an account of the first user 2.

Meanwhile, when the payment is less than the payment amount requiring an approval of the second users 3-1, 3-2, the processor 120 may respectively generate transfer information by dividing the payment according to a ratio of a payment amount requiring an approval of the second user 3-1 and a payment amount requiring an approval of the second user 3-2, respectively.

For example, when a payment amount requiring an approval of the second user 3-1 and a payment amount requiring an approval of the second user 3-2 are 10,000 KW, respectively, and the expected payment is 30,000 KW, and the payment made by the first user 2 exceeds 20,000 KW, since the payment made by the first user 2 is different from the expected payment and the payment is less than 20,000 KW which is the payment amounts requiring an approval of the second users 3-1, 3-2, the processor 120 may divide the payment (10,000 KW) based on the ratio (1:1) between the payment amount requiring an approval of the second user 3-1 and a payment amount requiring an approval of the second user 3-2, which gives 5,000 KW, and accordingly generate account transfer information for transferring 5,000 KW from an account of the second user 3-1 to an account of the first user 2 and account transfer information for transferring 10,000 KW from an account of the second user 3-2 to an account of the first user 2.

Meanwhile, for convenience of explanation, the above exemplifies that the first user 2 and the second users 3-1, 3-2 agreed upon the second type contract, and payment amounts requiring an approval of the second users 3-1, 3-2 are same as each other by the ratio of 1:1. However, the above technical concept may be applied to any example including when the contract of the users is the first type or when the ratio of the payment amounts requiring an approval is other than 1:1.

The processor 120 may transmit the generated account transfer information to the financial transaction server 500 associated with an account of the second user 3, and accordingly, in response to receiving the account transfer information, the financial transaction server 500 associated with an account of the second user 3 may perform account transfers based on the received account transfer information, respectively, and therefore, the first user 2 may receive the payment from the second user 3-1 and the second user 3-2 simultaneously upon making payment according to the agency payment contract. Meanwhile, after account transfer is completed, the processor 120 may also delete various information temporarily stored in the storage (not illustrated) with respect to the completed agency payment service.

Meanwhile, in the above embodiment in which information of the number of users to share the expected payment is included in the request for agency payment approval, the number of users to share the expected payment may include a user who does not use the agency payment service through the server 100.

For example, the first user 2, the second user 3 and a third user may agree upon a contract in which they dine together and each share a third of the dining cost, with the first user 2 making an advance payment for the entire cost on behalf of the others, and then the second user 3 and the third user repay their shared responsibilities. In this case, the first user 2 and the second user 3 are registered to the agency payment service provided by the server 100, and the third user is a non-registered user.

When assuming that the dining cost is 30,000 KW in total, the first user 2 may transmit a request for agency payment approval to the server 100 by using the terminal device 200 before paying the cost. The request for agency payment approval may include information associated with the expected payment (30,000 KW), information associated with the number of users to share the expected payment (i.e., 3 persons), and information associated with the second user 3.

In this case, the processor 120 may calculate a payment amount requiring an approval of the second user 3 as 10,000 KW by dividing the expected payment (30,000 KW) by the number (3) of the users to share responsibility, generate a message inquiring about approval or disapproval on 10,000 KW, and transmit the message to the terminal device 300 of the second user 3.

Accordingly, when the first user 2 makes payment of 30,000 KW upon having the approval of the second user 3, the processor 120 may generate account transfer information for requesting remittance of 10,000 KW (i.e., payment amount calculated by dividing the expected payment by the number of the users) from an account of the second user 3 to an account of the first user 2, and transmit the generated message to the financial transaction server 500 associated with an account of the second user 3. As a result, the first user 2 may receive a shared responsibility (i.e., 10,000 KW) of the second user 3 from the second user 3.

Meanwhile, because the third user is not registered to the agency payment service provided by the server 100, the first user 2 may not receive a shared responsibility (i.e., 10,000 KW) of the third user through the agency payment service provided by the server 100, in which case the first user 2 may receive repayment for 10,000 KW through separate means, such as by directly meeting the third user, using an account transfer method according to the related art, or the like.

The above exemplifies that the second user 3 is one person as illustrated in FIG. 3, but various embodiments are not limited thereto. Accordingly, when there are a plurality of second users 3 as in FIG. 4, the example described above, in which the number of the users to share the agency payment includes the third user not registered to the server 100, is equally applicable.

Meanwhile, in an embodiment of the present disclosure, apart from the number of the second users 3 or the type of the contract, some or all of the second users receiving the message inquiring about approval or disapproval on the request for agency payment approval may disapprove the request for agency payment approval. Referring to FIG. 4 as an example, the server 100 transmits the message inquiring about approval or disapproval on the request for agency payment approval to the terminal device 300-1 of the second user 3-1 and to the terminal device 300-2 of the second user 3-2, respectively, and the second user 3-1 approves the request for agency payment approval but the second user 3-2 disapproves it.

Accordingly, when an approval is received from the terminal device 300-1 of the second user 3-1 and a disapproval is received from the terminal device 300-2 of the second user 3-2 through the communicator 110, the processor 120 may control the communicator 110 to generate a message inquiring about whether to continue with agency payment and transmit the generated message to the terminal device 200 of the first user 2. The message inquiring about whether to continue with agency payment may include information on who approves and who disapproves the request for agency payment approval among a plurality of the second users, although not limited thereto.

Accordingly, the message inquiring about whether to continue with agency payment may be displayed on the terminal device 200 of the first user 2, and the first user 2 may confirm the message and determine whether to continue with the agency payment.

When the first user 2 makes payment despite the disapproval of the second user 3-2 on the request for agency payment approval so that payment information is received through the communicator 110, the processor 120 may control the communicator 110 to generate account transfer information for requesting remittance from an account of the second user 3-1 who approved the agency payment request among the plurality of second users 3-1, 3-2 to an account of the first user 2, and transmit the generated message to the financial transaction server associated with an account of the second user 3-1. A shared responsibility of the second user 3-2 should be repaid through another separate means to the first user 2.

Meanwhile, although the above exemplifies an example in which a disapproval is received from the terminal device 300-2 of the second user 3-2, the embodiments may not be limited thereto. For example, there may be no response of the terminal device 300-2 of the second user 3-2 for a predetermined time with respect to the message inquiring about approval or disapproval, in which case the processor 120 may determine that the second user 3-2 disapproves the approval request and perform the subsequent operations described above.

Further, when both of the second users 3-1, 3-2 disapprove the request for agency payment approval, the payment may not be repaid through the agency payment service provided by the server 100 even if the first user 2 makes payment.

Meanwhile, according to an embodiment of the present disclosure, the second user 3 may modify a payment amount requiring an approval included in the message inquiring about approval or disapproval and issues an approval.

For example, although the second user 3 receives the message inquiring about approval or disapproval on 10,000 KW in FIG. 3, the second user 3 may modify the amount to 5,000 KW and approve the agency payment based on the modified amount.

In this case, the server 100 may receive an approval for the modified payment from the terminal device 300 of the second user 3 through the communicator 110, and the processor 120 may generate a message inquiring about whether to continue with the agency payment and transmit the generated message to the terminal device of the first user 2. In an example, the message inquiring about whether to continue with the agency payment may include information indicating that request for agency payment approval is modified by the second user 3 and information associated with the modified amount, although the embodiments may not be limited thereto.

Accordingly, the message inquiring about whether to continue with agency payment may be displayed on the terminal device 200 of the first user 2, and the first user 2 may confirm the message and determine whether to continue with the agency payment.

When the first user 2 makes payment despite the approval of the second user 3-2 on the modified payment amount requiring an approval so that payment information is received through the communicator 110, the processor 120 may control the communicator 110 to generate account transfer information for requesting remittance of the modified amount from an account of the second user 3 to an account of the first user 2, and transmit the generated message to the financial transaction server associated with an account of the second user 3.

Meanwhile, according to an embodiment of the present disclosure, the server 100 may provide an agency payment service user list corresponding to a contact list stored in each of the terminal devices 200, 300, 300-1, 300-2 of the users 2, 3, 3-1, 3-2 registered to the server 100 to the terminal devices. For example, when a contact list is received from the terminal device 200 of the first user 2 through the communicator 110, the processor 120 may control the communicator 110 to determine the users subscribed to the agency payment service among users included in the contact list, generate an agency payment service user list corresponding to the contact list, and transmit the generated message to the terminal device 200 of the first user 2.

Specifically, the contact list received from the terminal device 200 of the first user 2 may include various information items, such as screen names (e.g., name, ID, or the like), addresses, e-mail addresses, and telephone numbers of the users stored by the first user 2. Accordingly, the processor 120 may compare various information included in the contact list with information associated with the users subscribed to the agency payment service stored in the storage (not illustrated), and determine the users subscribed to the agency payment service among the users included in the contact list. Accordingly, the processor 120 may generate an agency payment service user list corresponding to the contact list of the first user 2 and transmit the generated message to the terminal device 200 of the first user 2.

Accordingly, as described below, the first user 2 may select the second user 3 on the agency payment service user list and include information associated with the second user 3 in the request for agency payment approval.

Meanwhile, according to an embodiment of the present disclosure, when a credit card is registered in the mobile card applications installed on the terminal devices 200, 300, 300-1, 300-2, the server 100 may be able to provide various mobile card services for processing credit card payment through the terminal devices. In other words, the server for providing mobile card services according to the related art may also provide the agency payment service described above. However, various embodiments are not limited to the example given above.

Meanwhile, although the above describes that the request for agency payment approval, the message inquiring about approval or disapproval, approval or disapproval for the request for agency payment approval, the approval message may be transmitted and received between the server 100 and the terminal devices 200, 300, 300-1, 300-2, it is not necessary that each information should be transmitted and received simultaneously. Rather, the information mentioned above may also be transmitted and received successively and in order.

Figure 5:
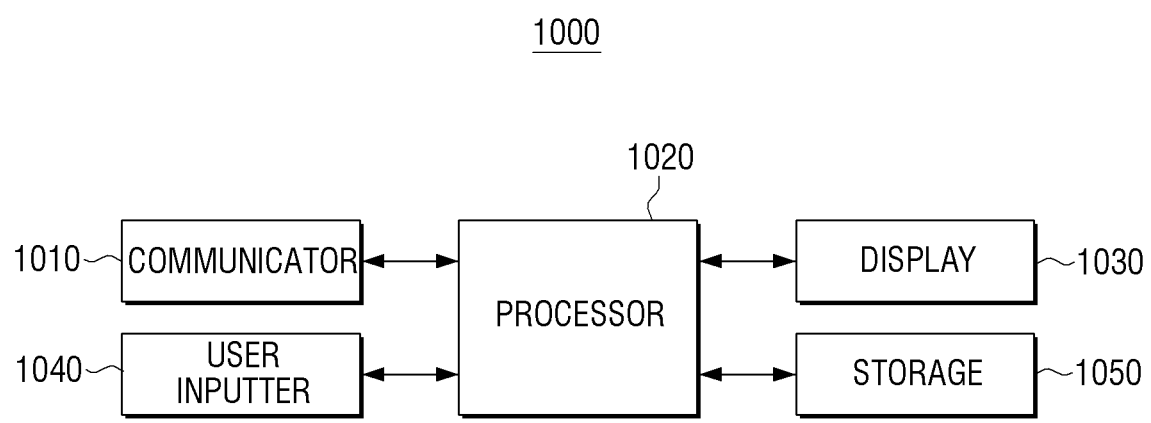
FIG. 5 is a block diagram of a constitution of a user terminal device according to an embodiment of the present disclosure.

FIG. 5 is a block diagram of a constitution of a user terminal device according to an embodiment of the present disclosure.

Referring to FIG. 5, a terminal device 1000 may be the terminal device 200 of the first user 2 described above, or the terminal devices 300, 300-1, 300-2 of the second users 3, 3-1, 3-2.

Meanwhile, the elements of the terminal device 1000 illustrated in FIG. 5 are illustrated only for convenience of explanation, and accordingly, some elements may be omitted or modified according to the type of the terminal device 1000, or other elements may be newly added.

The terminal device 1000 may be implemented as a mobile phone, such as smart phone, but the embodiments may not be limited thereto. Accordingly, the terminal device 1000 may be implemented as various types of devices that can store and implement applications and perform communication with the server 100, such as PDA, portable multimedia player (PMP), tablet, phablet, smart watch, MP3 player, or the like.

Although embodiments are described herein with reference to the constitution of the terminal device 1000 illustrated in FIG. 5 as a representative example of the terminal devices 200, 300, 300-1, 300-2 of the first user 2 and the second users 3, 3-1, 3-2 for convenience of explanation, it is to be noted that the type or the constitution of the terminal devices 200, 300, 300-1, 300-2 of the users 2, 3, 3-1, 3-2 may be also different from each other.

Referring to FIG. 5, the terminal device 1000 may include a communicator 1010, a processor 1020, a display 1030, a user inputter 1040, and a storage 1050.

The communicator 1010 may perform communication with an external device through various wiry and wireless networks. Specifically, the communicator 1010 may transmit and receive various information through a communication with the server 100, the payment terminal device 600-2, the application providing server, or the like, which provide the agency payment service under the control of the processor 1020.

To this purpose, the communicator 1010 may include near field communication (NFC) module and wireless communication module. The NFC module is configured to perform NFC wirelessly with an external device positioned in the proximity to the terminal device 1000. Specifically, the NFC module may include at least one of Bluetooth module, magnetic secure transmission (MST) module, IrDA module, NFC module, Wi-Fi module, and Zigbee module. The wireless communication module is configured to connect to an external network according to wireless communication protocols, such as Wi-Fi, IEEE, or the like, to perform communication with various servers. Besides, the wireless communication module may further include mobile communication module to connect to the mobile communication network and perform communication according to various mobile communication standards, such as 3G, 3GPP, LTE, or the like. Further, the communicator 1010 may include at least one of the wire communication module (not illustrated) according to communication standards, such as HDMI, USB, IEEE 1394, RS-232, RS-422, RS-485, and Ethernet.

The display 1030 may display a screen. In an example, the screen may include a screen of playing various contents, such as images, videos, texts, music, or a screen of executing application that includes various contents, graphic user interface (GUI) screen, or the like. Specifically, the display 1030 may display a screen of executing various agency payment applications under the control of the processor 1020 which will be described below.

To this purpose, the display 1030 may be implemented as various displays, such as liquid crystal display, thin film transistor-liquid crystal display, organic light-emitting diode, flexible display, three dimensional (3D) display, or the like. Further, the display 1030 may form a touch screen in inter-layer structure, in conjunction with a touch panel included in the user inputter 1040.

The user inputter 1040 is configured to receive user commands to control the terminal device 1000. To this purpose, the user inputter 1040 may include various buttons, a touch panel, a microphone, a camera, or the like. Accordingly, a user may input user commands to the terminal device 1000 through push manipulation, touch manipulation, voice utterance, motion, or the like. Specifically, a user may implement the agency payment application or input various information or user commands by manipulating the user inputter 1040 in order to receive the agency payment service from the server 100.

The storage 1050 is configured to store various programs and data necessary for operation of the terminal device 1000, which may be implemented as RAM, ROM, flash memory, HDD, SSD, or the like. Specifically, the storage 1050 may store various applications and data in order to receive the agency payment service from the server 100 through the terminal device 200.

The processor 1020 controls the overall operation of terminal device 1000. To this purpose, the processor 1020 may include one or more of CPU, controller, AP, CP, and ARM processor. Specifically, the processor 1020 may control the operation of the terminal device 1000 according to manipulation of the users subscribed to the agency payment service provided by the server 100 and provide the agency payment service.

First, the processor 1020 may control the communicator 1010 to connect the server 100 or the application providing server according to user manipulation received through the user inputter 1040, and receive the agency payment application provided by the server 100. The received agency payment application may be stored in the storage 150.

When a user command to implement the agency payment application is inputted through the user inputter 1040, the processor 1020 may control the display 1030 to implement the agency payment application stored in the storage 1050 and display screens of executing various agency payment applications according to user commands that follow, thereby providing the agency payment service to a user.

The following will explain specific operation of the processor 120 by referring to screens of executing various agent applications illustrated in FIGS. 6, 7, 8A, 8B, 8C, 9, 10, 11A, 11B, and 12. The screens illustrated in FIGS. 6, 7, 8A, 8B, 8C, 9, 10, 11A, 11B, and 12 may be merely one of embodiments of the present disclosure, and accordingly, type, name, form, position, arrangement, or the like, of the menu may be implemented differently.

Figure 6:
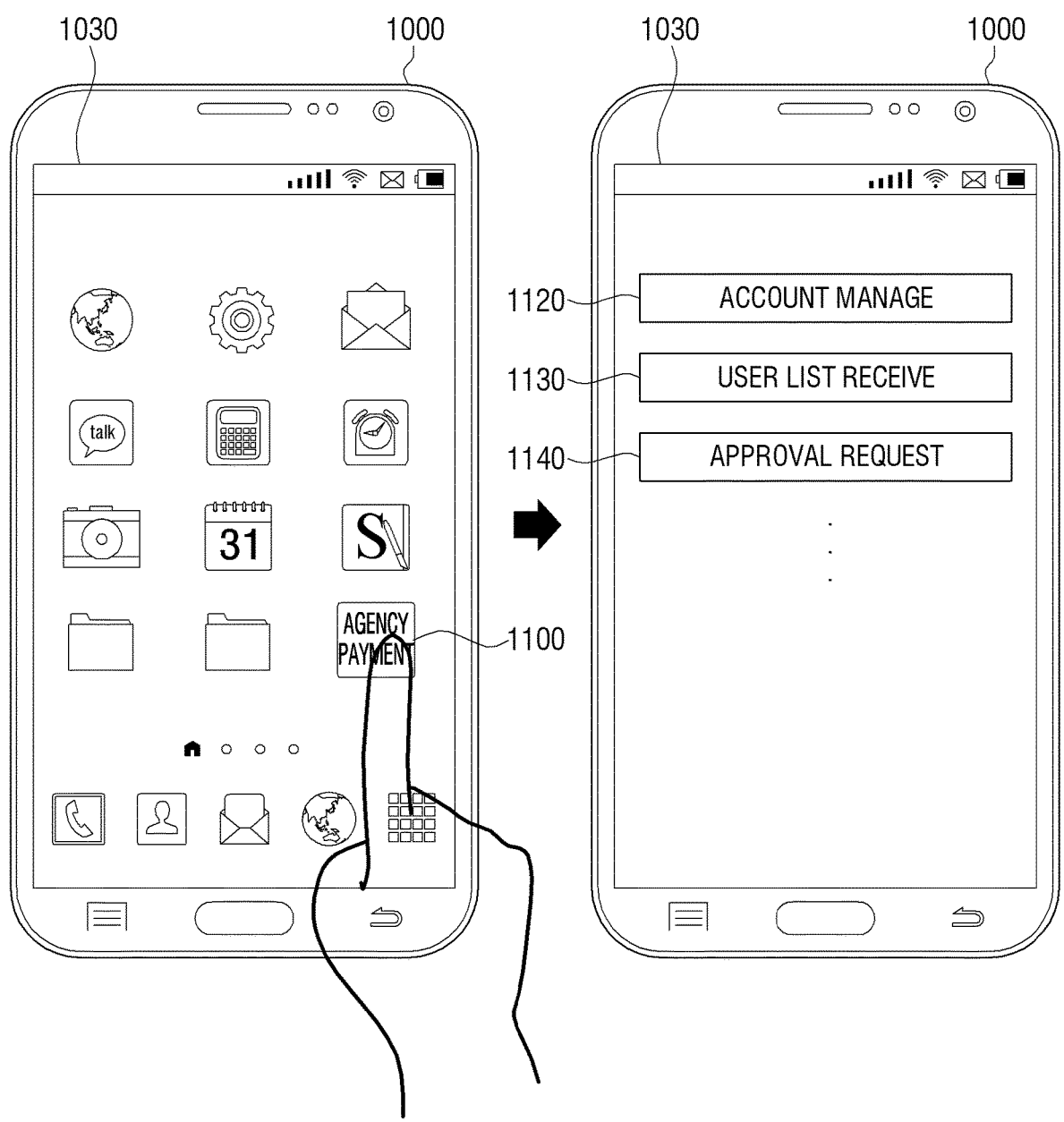
FIGS. 6, 7, 8A, 8B. 8C, 9, 10, 11A, 11B, and 12 are illustrations of screens of agency payment applications executed according to various embodiments of the present disclosure.

FIG. 6 illustrates a screen of executing agency payment service application according to an embodiment of the present disclosure.

Referring to FIG. 6, when a user executes the agency payment application by selecting an agency payment application icon 1100 displayed on the display 1030, the processor 1020 may control the display 1030 to display a screen of executing the agency payment application, which includes account manage menu 1120, user list receive menu 1130, and approval request menu 1140.

In an example, the account manage menu 1120 is provided to register and manage accounts of users subscribed to the agency payment service, and the user list receive menu 1130 is provided to obtain a list of the users subscribed to be registered to the agency payment service provided by the server 100 among the users in the contact lists of users stored in the terminal device 1000. Further, when a user is the first user 2, the approval request menu 1140 is provided to transmit the request for agency payment approval described above to the server 100.

The user may select various menus displayed on the screen of executing agency payment application and use the agency payment service provided by the server 100.

The following will specifically explain operation of the processor 1020 by referring to an example of a screen of executing agency payment application that is subsequently displayed when each of the menus 1120, 1130, 1140 is displayed.

As described above, the first user 2 requests an agency payment approval for using the agency payment service, and the request for agency payment approval may include, in the request for agency payment approval, account information of the first user 2 who will receive the repayment. Further, when the second user 3 approves the request for agency payment approval, the terminal device 300 of the second user 3 may transmit an approval including account information of the second user as the one that will repay a certain payment to the server 100.

Accordingly, a request for agency payment approval or an approval includes account information of a user, and the first user 2 or the second user 3 may register (e.g., with the account manage menu 1120) the account information to be included in the request for agency payment approval or in the approval on the agency payment application.

Figure 7:
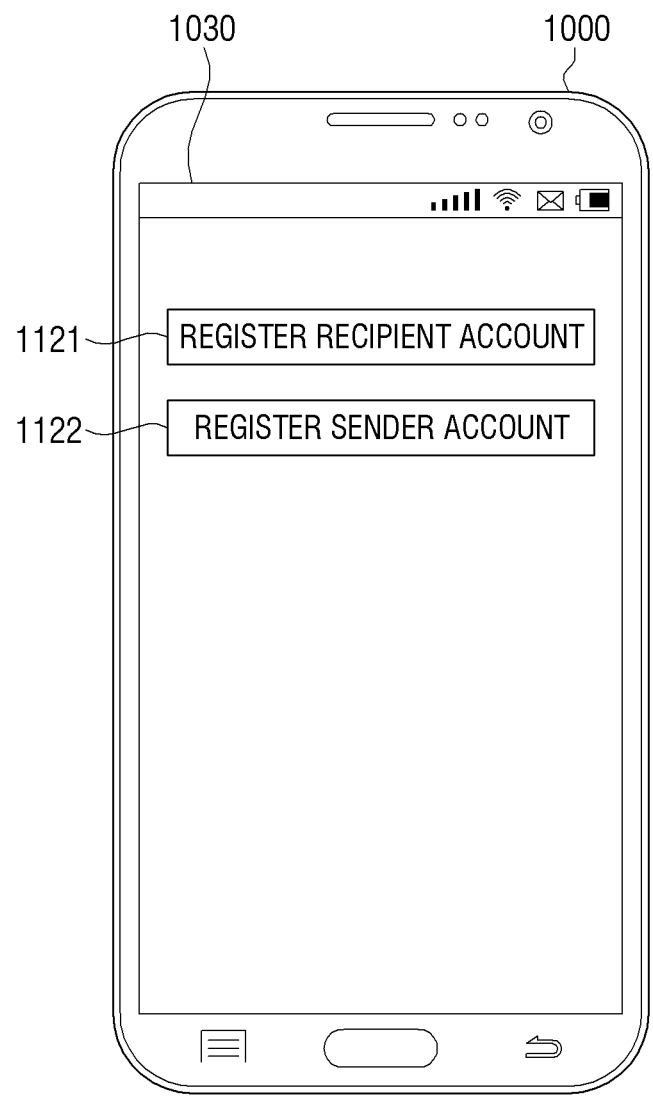

Specifically, when a user command of selecting the account manage menu 1120 is inputted in FIG. 6, the processor 1020 may control the display 1030 to display screen of executing agency payment application as illustrated in FIG. 7.

FIG. 7 illustrates a screen of executing agency payment applications provided for a user subscribed to an agency payment service provided by a server to register his account information according to an embodiment of the present disclosure.

Referring to FIG. 7, the screen for registration of the account information may include recipient register menu 1121 and sender account register menu 1122. The recipient register menu 1121 is provided to register an account to receive a repayment when the user is the first user 2 (i.e., agent payer), and the sender account register menu 1122 is provided to register an account to withdraw a repayment payment approved by the user when the user is the second user 3 (i.e., actual payer).

Accordingly, the user may previously register an account to receive a payment when using the agency payment service, i.e., an account to be included in the request for agency payment approval in the agency payment application by selecting the recipient register menu 1121, or previously register an account to withdraw a payment when using the agency payment service, i.e., an account to be included in the approval on the agency payment application by selecting the sender account register menu 1122. In an example, user account information registered to the agency payment application may be encrypted with various methods and stored.

Meanwhile, the request for agency payment approval of the first user 2 may include information associated with a user who will bear the entire or a portion of the expected payment, i.e., the information associated with the second user 3 to receive a request for an approval of the agency payment. Because the server 100 may provide the agency payment service only to the users who are subscribed and registered to the agency payment service, the first user 2 should know who would be the member(s) of the agency payment service among the users included in his contact list when requesting an agency payment approval.

Accordingly, the terminal device 200 may be provided with a list of users subscribed to the agency payment service provided by the server 100 among the contact list from the server 100. Specifically, in response to receiving a select command of a user with respect to the user list receive menu 1130 illustrated in FIG. 6, the processor 1020 may transmit the contact list stored in the storage 1050 to the server 100, and receive the agency payment service user list corresponding to the contact list from the server 100.

Therefore, the received agency payment service user list may be used to construct the user select items to select the second user 3 from the screen of executing agency payment application, which will be described below.

Meanwhile, when the user is the first user 2, the user may request an approval of agency payment to the second user 3 through the server 100 in order to use agency payment service. Specifically, the first user 2 may transmit a request for agency payment approval to the server 100 through the agency payment application installed on the terminal device 200, and the server 100 may generate a message inquiring about approval or disapproval by using various information included in the request for agency payment approval and transmit the generated message to the terminal device 300 of the second user 3, and the first user 2 may request an approval of agency payment to the second user 3. This is equally applicable to an example in which two or more of the second users are selected.

For example, when the first user 2 selects the approval request menu 1140 from the screen of executing agency payment application illustrated in FIG. 6, the processor 1020 may control the display 1030 to display various screens for requesting agency payment approval as in FIGS. 8A, 8B, 8C, 9, 10, 11A and 11B. The first user 2 may input various information on the agency payment approval request screen through the user inputter 1040, and the processor 1020 may control the communicator 1010 to transmit the request for agency payment approval including various information to the server 100.

Figure 8A:
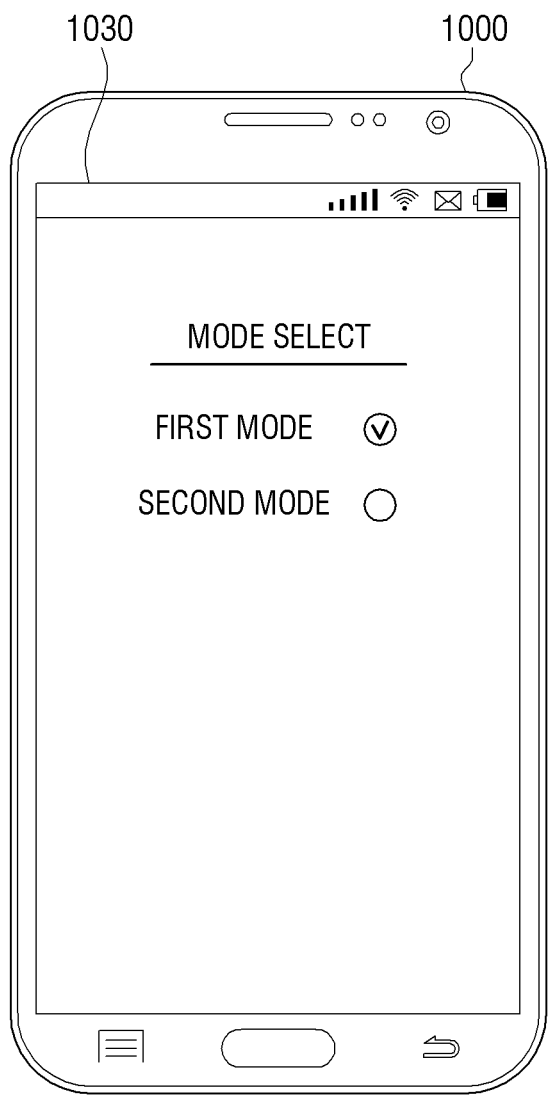
Figure 8B:
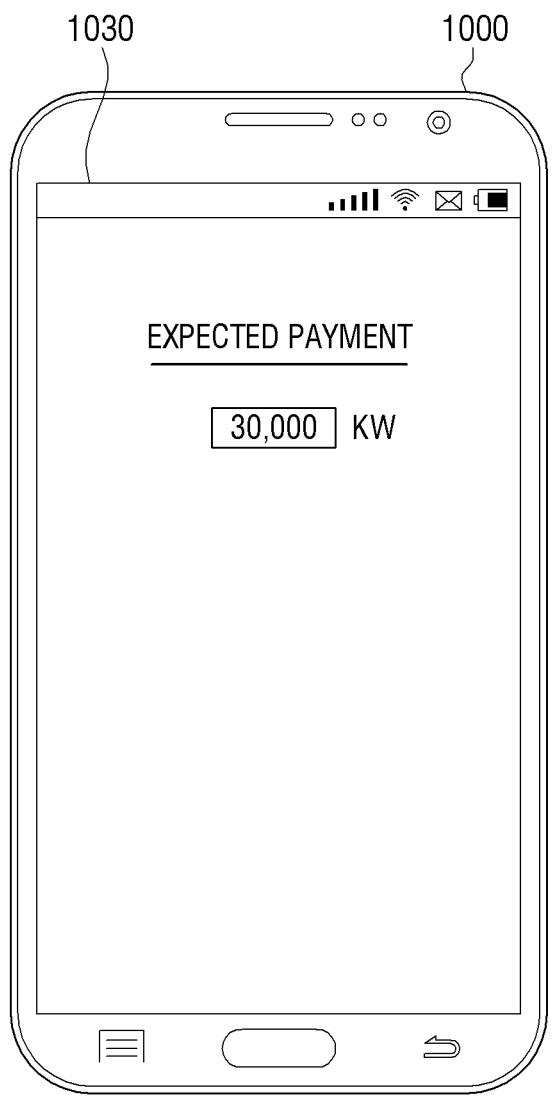
Figure 8C:
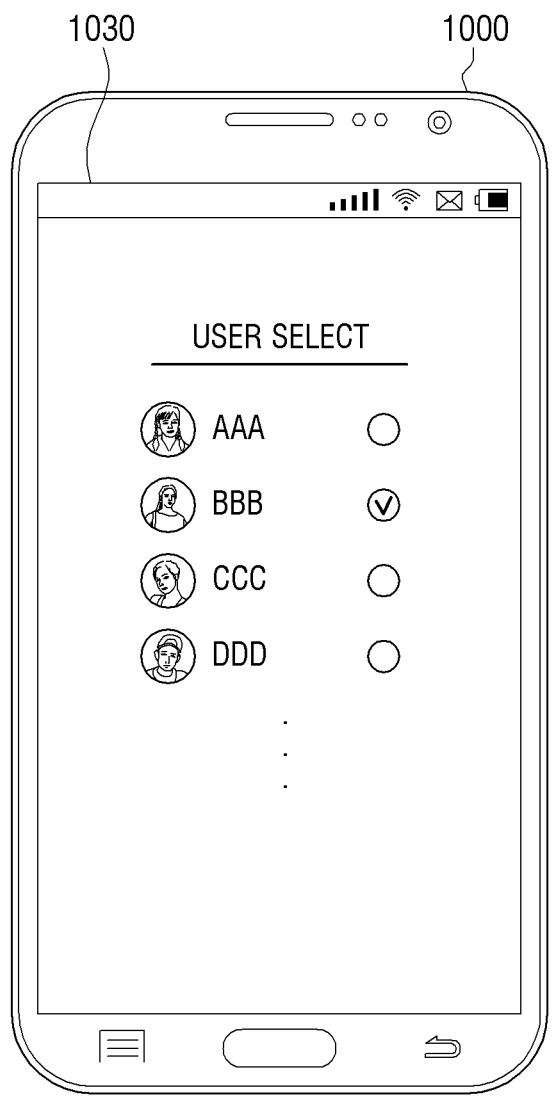

FIGS. 8A, 8B, and 8C are illustrations of agency payment approval request screen according to an embodiment of the present disclosure. The agency payment approval request screen may include items to input various information to be included in the request for agency payment approval.

Referring to FIG. 8A, an example of mode select items to input the mode information according to type of the agency payment contract is illustrated. The first mode illustrated in FIG. 8A refers to the mode corresponding to the first type contract, and the second mode refers to a mode corresponding to the second type contract, which is described above. Accordingly, the first user 2 may select one mode from the mode select items and include the mode information in the request for agency payment approval.

Meanwhile, a name of the mode information may not be limited to the first mode and the second mode illustrated in FIG. 8A, and may be varied depending on embodiments. For example, other names, such as 'agency payment mode' or '1:1 payment mode' may be used instead of the first mode, and names, such as 'Dutch pay mode,' or the like, may be used instead of the second mode.

Referring to FIG. 8B, an example of an expected payment input item with which the first user 2 inputs an expected payment is illustrated. The first user 2 may input an expected payment through the expected payment input item as illustrated in FIG. 8B.

Referring to FIG. 8C, an example of a user select item to select users to share the expected payment is illustrated. The user list included in the user select item have all the users registered to the agency payment service. Accordingly, the first user 2 may select one or more second users 3 from the users displayed on the user select item and include the information associated with the second users 3 in the request for agency payment approval.

According to an embodiment of FIGS. 8A, 8B, and 8C, the first user 2 selects the first mode, inputs 30,000 KW as expected payment, and selects BBB as the second user 3. In this example, the request for agency payment approval transmitted to the server 100 may include the first mode as the mode information, 30,000 KW as the expected payment information, and BBB as the information associated with the second user 3, and the server 100 may generate a message inquiring about approval or disapproval on the request for agency payment approval by using the information included in the request for agency payment approval, and transmit the generated message to the terminal device 300 of the second user 3. The message inquiring about approval or disapproval may include 30,000 KW, which is obtained by dividing the expected payment (30,000 KW) by the total number (1) of the second users 3, as a payment amount requiring an approval of the second user 3.

When the mode information of FIG. 8A is selected to be the second mode, the server 100 may calculate a payment amount (15,000 KW) requiring an approval of the second user 3 by dividing the expected payment (30,000 KW) by the total number (2) of the first user 2 and the second user 3, and transmit a message inquiring about approval or disapproval which includes the result of the above calculation to the terminal device 300 of the second user 3.

Meanwhile, each of the items of FIGS. 8A, 8B, and 8C may be sequentially displayed on the display 1030 according to the user's selection and the information input, although the embodiments may not be limited thereto. Accordingly, each of the items may be displayed on one screen in some embodiments.

Figure 9:
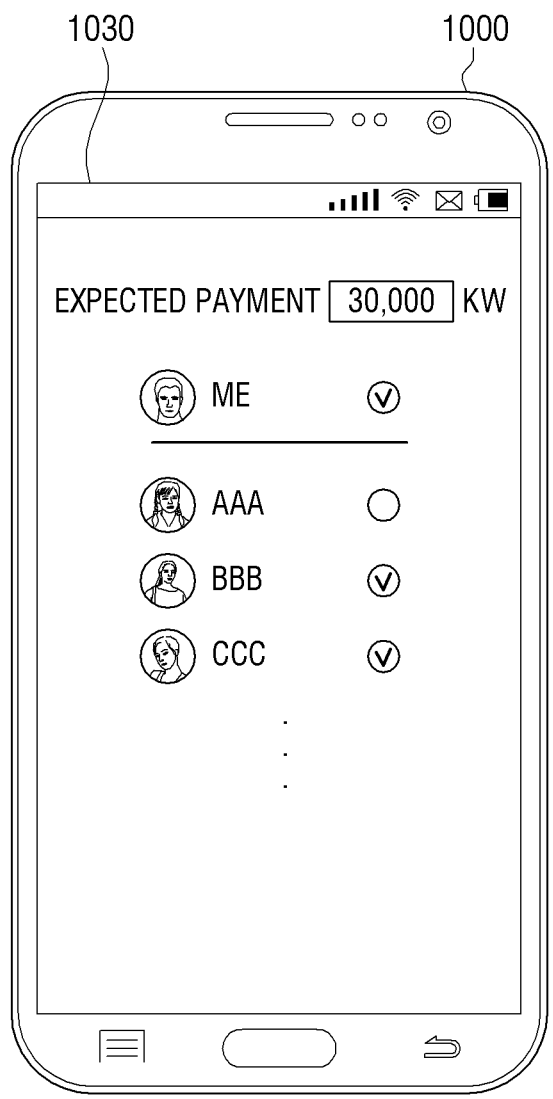

FIG. 9 is an illustration of agency payment approval request screen according to an embodiment of the present disclosure.

Referring to FIG. 9, as described above with reference to the embodiment of the server 100, the processor 120 of the server 100 may determine a mode according to presence or absence of the information associated with the first user 2 as the information associated with users to share the expected payment. FIG. 9 illustrates one example of the agency payment approval request screen corresponding to the above operation of the server 100.

Specifically, referring to FIG. 9, instead of the mode select item, item "ME" is added to the user select item as one of users to share an expected payment, which is different from FIG. 8. Accordingly, the first user 2 may present the second mode by selecting the item "ME" to include himself in the users to share the expected payment.

As illustrated in FIG. 9, the server 100 receiving the request for agency payment approval including "ME," "BBB," and "CCC" as information associated with users to share the expected payment may determine the mode to be the second mode, calculate a payment amount requiring an approval of the second user (i.e., 10,000 KW) by dividing the expected payment (30,000 KW) by the total number (3) of the first user 2 ("ME") and the second users ("BBB," "CCC"), and transmit a message inquiring about approval or disapproval on 10,000 KW to the terminal devices of "BBB" and "CCC," respectively.

When the item "ME" is not selected at the user select item, the server 100 may determine the mode information to be the first mode, and transmit a message inquiring about approval or disapproval on 15,000 KW to the terminal devices of "BBB" and "CCC," respectively.

Figure 10:
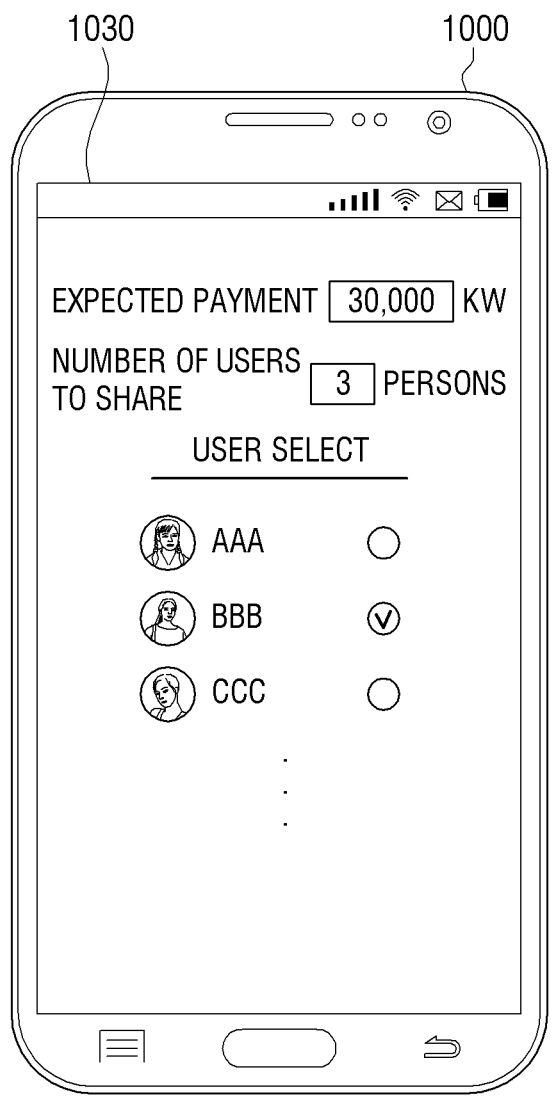

FIG. 10 is an illustration of agency payment approval request screen according to another embodiment of the present disclosure. As described above with reference to the embodiment of the server 100, a request for agency payment approval may include the information associated with the number of users to share an expected payment. FIG. 10 illustrates an example of corresponding screen of executing agency payment application.

Referring to FIG. 10, "the number of users to share" item is included. Accordingly, the first user 2 may input information associated with the number of users to share an expected payment through the "the number of users to share" item.

For example, when the first user 2 who is a user of the terminal device 1000, "BBB" who is registered to the agency payment service provided by the server 100, and "XXX" who does not use the agency payment service share a payment per ⅓, and when the first user 2 makes an advance payment for the entire payment (30,000 KW), the first user 2 may be repaid a shared responsibility of "BBB" through the agency payment service provided by the server 100 after advance paying the entire price, and separately repaid a shared responsibility of "XXX."

In this case, the first user 2 inputs the expected payment as 30,000 KW in the agency payment approval request screen as illustrated in FIG. 10, and inputs the number of the users to share responsibility as 3, and select "BBB" from the user select item.

Accordingly, the server 100 receiving the request for agency payment approval including 3 as information associated with the number of the users to share responsibility may calculate a payment amount requiring an approval of the second user (i.e., 10,000 KW) by dividing the expected payment (30,000 KW) by the number (3) of the users to share responsibility, and transmit a message inquiring about approval or disapproval on 10,000 KW to the terminal device of the second user (i.e., "BBB").

Although FIG. 10 exemplifies that a user who does not use the agency payment service is included, the embodiments may not be limited thereto.

Figure 11A:
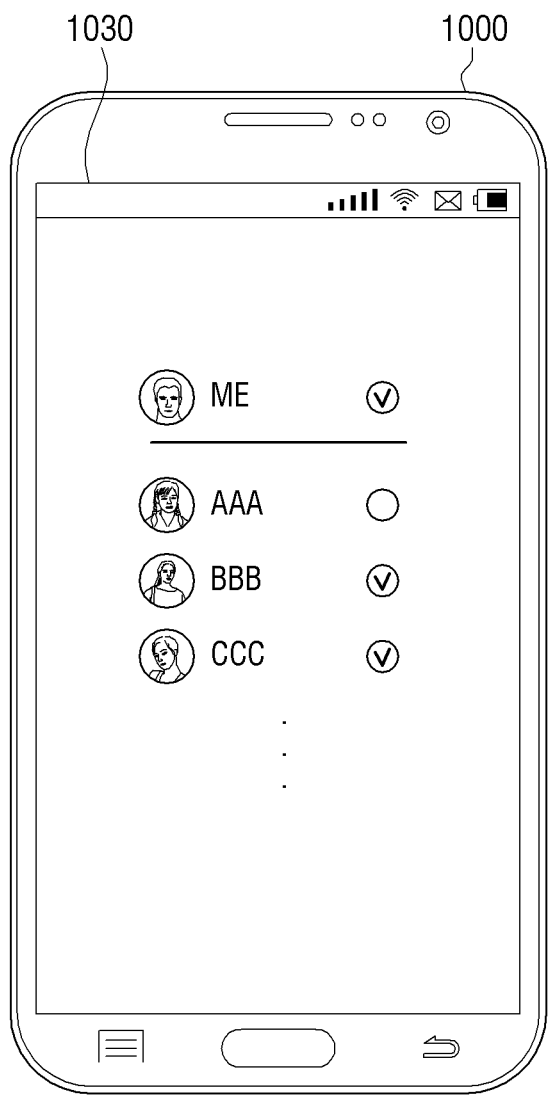
Figure 11B:
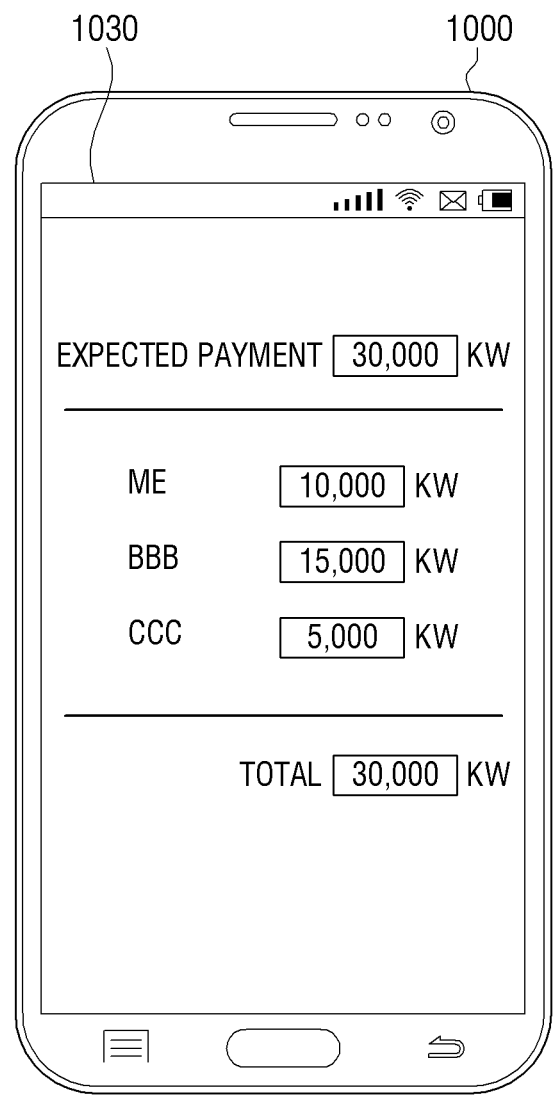

FIGS. 11A and 11B are illustrations depicting an agency payment approval request screen according to an embodiment of the present disclosure.

Referring to FIGS. 11A and 11B, as described above with reference to the embodiment of the server 100, a request for agency payment approval may include the information associated with the share information, and FIG. 10 illustrates an example of corresponding screen of executing agency payment application to input information on the respective shares of the payment.

For example, when "I," "BBB," and "CCC" are selected from the user select item as illustrated in FIG. 11A, the processor 1020 may display the payment share information input item as shown in FIG. 11B. The first user 2 may directly input a payment in the payment share information input item, and therefore, include information associated with each user's share of payment in the request for agency payment approval.

Meanwhile, although not illustrated, according to an embodiment of the present disclosure, the processor 1020 may display the agency payment approval request screen including an item for inputting information associated with a ratio to share the expected payment, and may display the agency payment approval request screen that may further include information associated with goods to be paid by the first user 2, information associated with shops, information associated with expected payment time, or the like.

When various information are inputted through the agency payment approval request screen described above, and when a user command to transmit the request for agency payment approval is inputted, the processor 1020 may control the communicator 1010 to transmit a request for agency payment approval including various information inputted through the agency payment approval request screen and recipient information registered to the agency payment application to the server 100.

Accordingly, the server 100 receiving the request for agency payment approval from the terminal device 200 of the first user 2 may generate a message inquiring about approval or disapproval on the request for agency payment approval by using various information included in the request for agency payment approval, and transmit the generated message to the terminal device 300 of the second user 3.

The terminal device 300 of the second user 3 receiving a message inquiring about approval or disapproval from the server 100 may display the received message. Specifically, when the terminal device 1000 is the terminal device 300 of the second user 2, the processor 1020 may control the display 1030 to display the received message if a message inquiring about approval or disapproval is received through the communicator 1010. In an example, the message inquiring about approval or disapproval may include information on the first user 2 requesting an approval on the agency payment, and information on a payment amount requiring approval of the second user 3.

Figure 12:
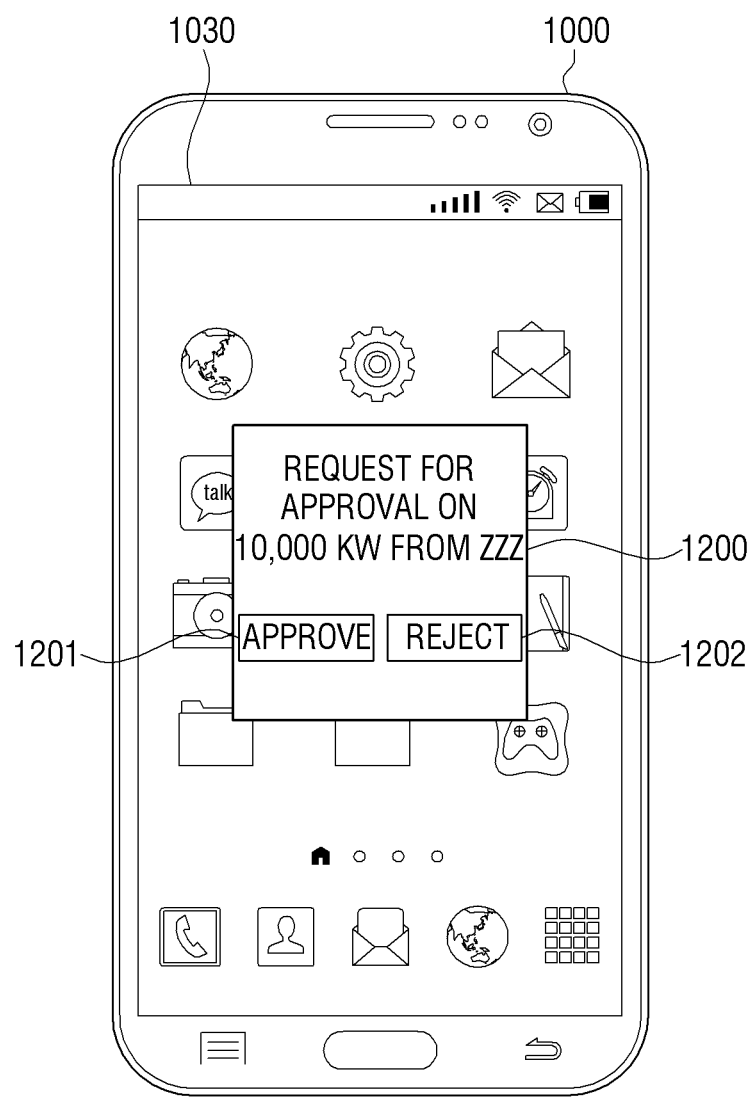

FIG. 12 illustrates a message inquiring about approval or disapproval being displayed in a pop-up form on a display of a terminal device of a second user according to an embodiment of the present disclosure.

Referring to FIG. 12, the first user 2 (e.g., "ZZZ") is requesting an approval on a payment of 10,000 KW.

Accordingly, the second user 3 may approve an approval request of the first user 2 by selecting an approval icon 1201 included in the approval message through the user inputter 1040, or disapprove an approval request of the first user 2 by selecting a reject icon 1202.

An embodiment of displaying a message 1200 inquiring about approval or disapproval may not be limited to FIG. 12. For example, with respect to methods for displaying a message, instead of the pop-up form of FIG. 12, message description may be displayed when a user command to confirm the message 1200 is provided. Further, the description of the displayed message 1200 may further include the information associated with goods to be paid by the first user 2, information associated with shops, information associated with payment time, or the like, in addition to that shown in FIG. 12.

Accordingly, when the second user 3 approves or disapproves an approval request, the processor 1020 may control the communicator 1010 to transmit corresponding approval result to the server 100.

Specifically, when the second user 3 approves an approval request, the processor 1020 of the terminal device 200 of the second user 3 may control the communicator 1010 to transmit an approval of the request for agency payment approval including sender account information registered to the agency payment application to the server 100. When the second user 3 disapproves an approval request, the processor 1020 may control the communicator 1010 to transmit a disapproval on the request for agency payment approval to the server 100.

The server 100 receiving an approval or a disapproval from the terminal device 300 of the second user 3 may generate an approval message, a disapproval message, or depending on cases, a message inquiring about whether to continue with the agency payment, and transmit the generated message to the terminal device 200 of the first user 2.

When the terminal device 1000 is the terminal device 200 of the first user 2, and when an approval message, a disapproval message or a message inquiring about whether to continue with agency payment is received from the server 100 as described above, the processor 1020 may control the display 1030 to display the received message. Accordingly, the first user 2 may confirm that his or her request for agency payment approval is approved or disapproved.

The first user 2 confirming the message described above may make payment or may not make payment according to the agency payment contract by using various payment means, and when making the payment, a repayment according to the contract may be transferred simultaneously as the payment is made, as described above with reference to the server 100.

Meanwhile, according to an embodiment of the present disclosure, when the terminal device 1000 is the terminal device 200 of the first user 2, the first user 2 may make payment by using the terminal device 1000. For example, when the first user 2 is subscribed to the app card service or the mobile card service, and installs the app card application or the mobile card application on the terminal device 1000, a card may be used through the terminal device 1000 by registering a card (credit card, check card, debit card, cash card, or the like) on the installed application.

Specifically, with respect to the app card method, when the first user 2 implements the app card application, the processor 1020 may control the display 1030 to display bar code or QR code corresponding to the card registered to the application. Accordingly, card payment may be performed by reading the bar code or the QR code displayed on the terminal device 1000 with the payment terminal device 600-2 provided at offline shops.

Meanwhile, with respect to the mobile card method, when the first user 2 executes the mobile card application, the processor 1020 may control the communicator 1010 to transmit card information stored in an integrated circuit (IC) chip within the terminal device 1000 or card information registered to the application to the payment terminal device 600-2 wirelessly. The wireless communication method between the payment terminal device 600-2 and the communicator 1010 may be near distance communication method, such as NFC method or MST method, although the embodiments may not be limited thereto. Accordingly, the first user 2 may execute the mobile card application and then perform the card payment by tagging the terminal device 1000 on the payment terminal device 600-2.

Meanwhile, when the first user 2 purchases various goods or services which are on sale at online shops on the network according to the agency payment contract, and makes online payment, the processor 1020 may control the display 1030 to connect the various servers providing the payment service associated with corresponding online shops and display a payment page. Accordingly, the first user 2 may make online payment through the payment page.

Meanwhile, although the above exemplifies that the terminal device 1000 is a mobile device, the embodiments may not be limited thereto. Even when the terminal device 1000 is other than a mobile device, such as desktop personal computer (PC), smart television (TV), or the like, the technical concept of the present disclosure may be applied. For example, when the first user 2 requests an approval of the agency payment to the second user 3 by using PC at home and when an approval request is approved, the first user 2 may receive the repayment for the paid payment simultaneously upon making payment by performing payment according to the agency payment contract at offline shops or online shops.

Figure 13:
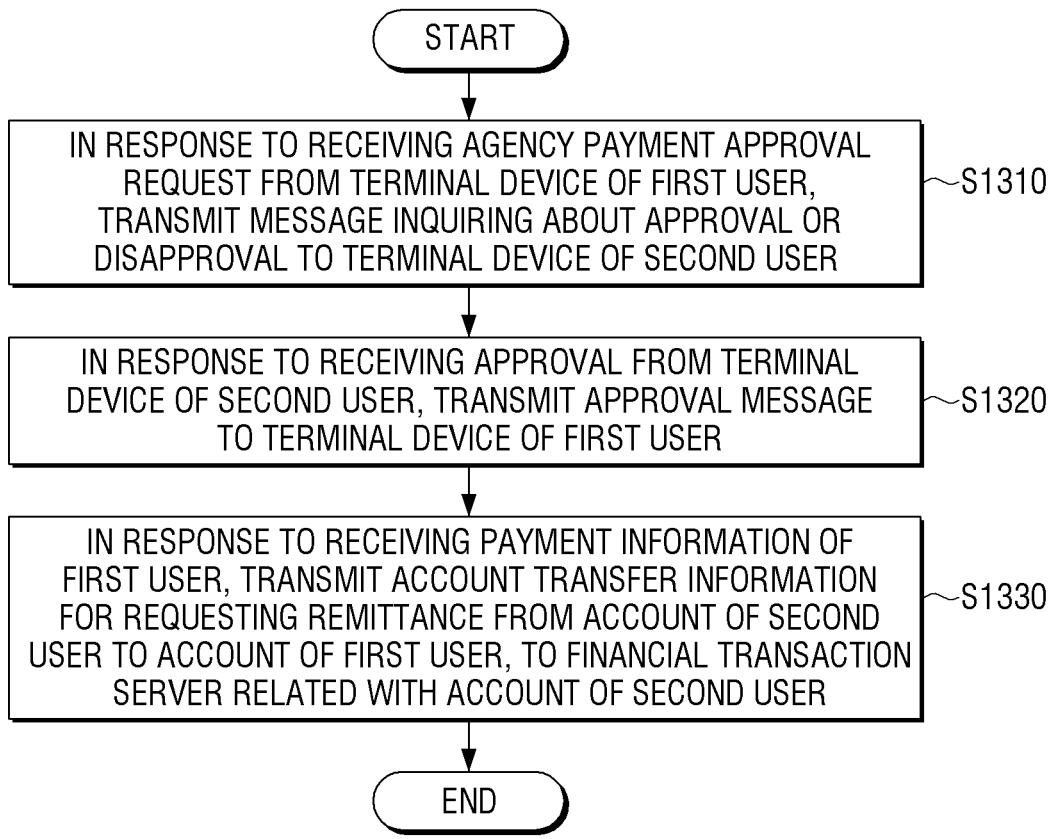
FIG. 13 is a flowchart illustrating a controlling method of a server according to an embodiment of the present disclosure.

FIG. 13 is a flowchart illustrating a controlling method of a server according to an embodiment of the present disclosure.

Referring to FIG. 13, detailed explanation already described above will not be redundantly provided. In response to receiving a request for agency payment approval including expected payment associated with agency payment, account information of the first user 2, and information associated with one or more second users 3 from the terminal device 200 of the first user 2, the server 100 may transmit a message inquiring about approval or disapproval on a request for agency payment approval to the terminal device 300 of the second user 3, at operation S1310.

According to an embodiment of the present disclosure, a request for agency payment approval may further include the mode information indicating one of the first mode in which the expected payment is all paid by the second user 3, and the second mode in which the expected payment is shared by the first user 2 and the second user 3.

In this case, when the mode information is the first mode, the server 100 may transmit a message inquiring about approval or disapproval on a payment that is calculated by dividing the expected payment by the total number of the second user 3 to the terminal device 300 of the second user 3. When the mode information is the second mode, the server 100 may transmit a message inquiring about approval or disapproval on a payment that is calculated by dividing the expected payment by the total number of the first user 2 and the second user 3 to the terminal device 300 of the second user 3.

Accordingly, when an approval including account information of the second user 3 is received from the terminal device 300 of the second user 3, the server 100 may transmit an approval message with respect to the request for agency payment approval to the terminal device 200 of the first user 2, at operation S1320.

The first user 2 receiving an approval message may make payment according to the agency payment contract. Accordingly, when payment information of the first user 2 with respect to agency payment is received, the server 100 may transmit account transfer information for requesting remittance from an account of the second user 3 to an account of the first user 2 to the financial transaction server associated with an account of the second user 3, at operation S1330.

Specifically, when the mode information is the first mode and when payment information is received, the server 100 may transmit account transfer information for requesting remittance of a payment that is calculated by dividing the expected payment by the total number of the second user 3 to the financial transaction server 500 associated with an account of the second user 3. When the mode information is the second mode and when payment information is received, the server 100 may transmit account transfer information for requesting remittance of a payment that is calculated by dividing the expected payment by the total number of the first user 2 and the second user 3 to the financial transaction server 500 associated with an account of the second user 3.

Meanwhile, according to another embodiment of the present disclosure, the request for agency payment approval may further include information associated with the number of users to share the expected payment. In this case, the server 100 may transmit a message inquiring about approval or disapproval on a payment that is calculated by dividing the expected payment by the total number of users to share responsibility to the terminal device 300 of the second user 3. According to an embodiment of the present disclosure, the users to share responsibility may further include users who do not use the agency payment service through the server 100 in addition to the first user 2 and the second user 3.

In this case, when payment information is received, the server 100 may transmit account transfer information for requesting remittance of a payment that is calculated by dividing the expected payment by the number of users to share responsibility to the financial transaction server 500 associated with an account of the second user 3.

Meanwhile, according to another embodiment of the present disclosure, the request for agency payment approval may include the share information associated with a ratio to share the expected payment or a share of payment of the expected payment between the first user 2 and the second user 3. In this case, the server 100 may transmit a message inquiring about approval or disapproval on a payment that is calculated by dividing the expected payment by the share information to the terminal device 300 of the second user 3.

When payment information is received, the server 100 may transmit account transfer information for requesting remittance of a payment that is calculated by dividing the expected payment according to the share information to the financial transaction server 500 associated with an account of the second user 3.

Meanwhile, according to an embodiment of the present disclosure, when there are a plurality of second users 3, disapprovals with respect to a request for agency payment approval may be received from terminal device(s) of certain user(s) among the plurality of second users 3, and approvals may be received from terminal devices of the other users. In this case, the server 100 may transmit a message inquiring about whether to continue with agency payment to the terminal device 300 of the first user 2.

Thereafter, when payment information is received, the server 100 may transmit account transfer information for requesting remittance from accounts of the users approving a request for agency payment approval among the plurality of second users to an account of the first user 2 to the financial transaction server associated with each account of the users approving the request for agency payment approval.

Meanwhile, according to an embodiment of the present disclosure, the message inquiring about approval or disapproval may include information associated with a payment amount requiring an approval of the second user. When the expected payment is different from a payment included in the payment information, the server 100 may transmit account transfer information for requesting remittance of a lesser of the payment amount requiring an approval of the second user 3 and the paid amount to the financial transaction server 500 associated with an account of the second user 3.

Meanwhile, according to an embodiment of the present disclosure, the first user 2 may make payment by using his terminal device 200. In this case, when the terminal device 200 of the first user 2 performs payment through communication with the payment terminal device 600-2, the server 100 may receive payment information from the financial transaction server 400 associated with payment of the first user 2.

According to the various embodiments described above, an agent payer may receive repayment simultaneously upon making a payment without having to expose personal information, and on the actual payer part, he or she is also enabled to repay the payment conveniently without having to go through cumbersome processes. In other words, inconvenience of the repayment and risk of exposing personal information which may occur during the agent purchasing process can be addressed.

Specifically, according to the various embodiments described above, payment of an agent payer and payment remittance of an actual payer can be processed at once as a series of operations, and inconvenience of an actual payer who has to execute another application, such as mobile banking application to make the payment to an agent payer can be addressed. Further, because user account information is registered and stored in the agency payment application installed on the user terminal device rather than being registered and stored in the server 100, and is removed from the server 100 after internally processed in the agency payment service procedure, exposure of the personal information can be prevented.

Meanwhile, operation of the processor 120 of the server 100 or the controlling method of the server 100 according to the above various embodiments may be generated as software and mounted on the server 100.

For example, the server 100 may install non-transitory computer readable medium storing a program for performing a controlling method of the server 100, including: in response to receiving a request for agency payment approval including the expected payment with respect to agency payment, account information of the first user 2, and information associated with one or more second users 3 from the terminal device 200 of the first user 2, transmitting a message inquiring about approval or disapproval on a request for agency payment approval to the terminal device 300 of the second user 3; in response to receiving an approval including account information of the second user 3 from the terminal device 300 of the second user 3, transmitting an approval message with respect to the request for agency payment approval; and in response to receiving payment information of the first user 2 with respect to agency payment, transmitting account transfer information for requesting remittance from an account of the second user 3 to an account of the first user 2 to the financial transaction server 500 associated with an account of the second user 3.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a server, the method comprising:
   receiving, from a terminal device of a first user via a communication interface of the server, an approval request for an agency payment, the approval request including information on a total amount of expected payment corresponding to the agency payment, encrypted account information of the first user, and identification information on a second user;
   determining, by at least one processor of the server, whether the first user and the second user are registered with the server based on information on users subscribed to an agency payment service provided by the server and the approval request, the information for the users being stored in a memory of the server;
   in response to determining that the first user and the second user are registered with the server, generating, by the at least one processor of the server, an inquiry message inquiring about approval or disapproval of the approval request, the inquiry message including identification information on the first user and information on an amount to be borne by the second user of the total amount of the expected payment;
   transmitting, to a terminal device of the second user via the communication interface of the server, the inquiry message;
   receiving, from the terminal device of the second user via the communication interface of the server, an approval for the approval request, the approval for the approval request including encrypted account information of the second user;
   in response to receiving the approval for the approval request, generating, by the at least one processor of the server, an approval message indicating that the approval request of the first user is approved;
   transmitting, to the terminal device of the first user via the communication interface of the server, the approval message;
   in response to receiving, from a financial transaction server associated with the agency payment of the first user via the communication interface of the server, payment information for the total amount of expected payment in connection with the agency payment, decrypting the encrypted account information of the first user and the second user;
   generating, by the at least one processor of the server, account transfer information for requesting remittance from an account of the second user to an account of the first user based on the decrypted account information of the first user and the second user;
   transmitting, to a financial transaction server associated with the account of the second user via the communication interface, the account transfer information; and
   in response to receiving, from the financial transaction server associated with the account of the second user via the communication interface, a message indicating that the account transfer is completed according to the account transfer information, deleting the encrypted account information and the decrypted account information of the first user and the second user, which are temporarily stored in the memory to provide the agency payment service.

2. The method of claim 1,
   wherein the approval request further comprises mode information indicating one of a first mode and a second mode,
   wherein the first mode indicates that the second user is to pay the total amount of the expected payment, and
   wherein the second mode indicates that the first user and the second user are to share the total amount of the expected payment.

3. The method of claim 2, wherein the generating of the inquiry message comprises:
   determining, by the at least one processor of the server, whether the approval request includes the mode information,
   when the approval request includes the mode information and the mode information is the first mode, generating the inquiry message including information indicating that the second user is to pay the total amount of the expected payment; and
   when the approval request includes the mode information and the mode information is the second mode, generating the inquiry message including information indicating that the first user and the second user are to divide the total amount of the expected payment.

4. The method of claim 3, further comprising:
   generating, by the at least one processor of the server, the account transfer information based on the mode information included in the approval request.

5. The method of claim 1,
   wherein the approval request further comprises information associated with a number of users to share the total amount of the expected payment, wherein the generating of the inquiry message further comprises:
dividing the total amount of the expected payment by the number of users to determine the amount to be borne by the second user,
wherein the account transfer information further includes the information on the amount to be borne by the second user.

6. The method of claim 5, wherein at least one of the number of users to share the total amount of the expected payment is associated with a user not registered with the server.

7. The method of claim 1,
wherein the approval request further comprises information associated with a ratio of the total amount of the expected payment attributable between the first user and the second user,
wherein the generating of the inquiry message further comprises:
determining the amount to be borne by the second user based on the information associated with the ratio of the total amount of the expected payment attributable between the first user and the second user,
wherein the account transfer information further includes the information on the amount to be borne by the second user.

8. The method of claim 1, further comprising:
when a plurality of users are to share the total amount of the expected payment, receiving, from a terminal device of a third user via the communication interface of the server, a disapproval for the approval request; and
in response to receiving the disapproval for the approval request, redetermining the amount to be borne by the second user,
wherein the account transfer information is generated based on the redetermined amount to be borne by the second user.

9. The method of claim 1,
wherein the account transfer information further includes information on a transfer amount based on the information on the amount to be borne by the second user.

10. A server comprising:
a communication interface configured to transmit or receive information over a communication network;
a memory; and
at least one processor configured to:
receive, from a terminal device of a first user via the communication interface, an approval request for an agency payment, the approval request including information on a total amount of expected payment corresponding to the agency payment, encrypted account information of the first user, and identification information on a second user,
determine whether the first user and the second user are registered with the server based on information of users subscribed to an agency payment service provided by the server and the approval request, the information for the users being stored in the memory,
in response to determining that the first user and the second user are registered with the server, generate an inquiry message inquiring about approval or disapproval of the approval request, the inquiry message including identification information on the first user and information on an amount to be borne by the second user of the total amount of the expected payment,
control the communication interface to transmit, to a terminal device of the second user, the inquiry message,
receive, from the terminal device of the second user via the communication interface, an approval for the approval request, the approval for the approval request including encrypted account information of the second user,
in response to receiving the approval for the approval request, generate an approval message indicating that the approval request of the first user is approved,
control the communication interface to transmit, to the terminal device of the first user, the approval message,
in response to receiving, from a financial transaction server associated with the agency payment of the first user via the communication interface, payment information for the total amount of expected payment in connection with the agency payment, decrypting the encrypted account information of the first user and the second user,
generate account transfer information for requesting remittance from an account of the second user to an account of the first user based on the decrypted account information of the first user and the second user,
control the communication interface to transmit, to a financial transaction server associated with the account of the second user, the account transfer information, and
in response to receiving, from the financial transaction server associated with the account of the second user via the communication interface, a message indicating that the account transfer is completed according to the account transfer information, delete the encrypted account information and the decrypted account information of the first user and the second user, which are temporarily stored in the memory to provide the agency payment service.

11. The server of claim 10,
wherein the approval request further comprises mode information indicating one of a first mode and a second mode,
wherein the first mode indicates that the second user is to pay the total amount of the expected payment, and
wherein the second mode indicates that the first user and the second user are to share the total amount of the expected payment.

12. The server of claim 11, wherein, to generate the inquiry message, the at least one processor is further configured to:
determine whether the approval request includes the mode information,
when the approval request includes the mode information and the mode information is the first mode, generate the inquiry message including information indicating that the second user is to pay the total amount of the expected payment, and
when the approval request includes the mode information and the mode information is the second mode, generate the inquiry message including information indicating that the first user and the second user are to divide the total amount of the expected payment.

13. The server of claim 12, wherein the at least one processor is further configured to:
generate the account transfer information based on the mode information included in the approval request.

14. The server of claim 10,
wherein the approval request further comprises information associated with a number of users to share the total amount of the expected payment,
wherein, to generate the inquiry message, the at least one processor is further configured to:
divide the total amount of the expected payment by the number of users to determine the amount to be borne by the second user, and
wherein the account transfer information further includes the information on the amount to be borne by the second user.

15. The server of claim 14, wherein at least one of the number of users to share the total amount of the expected payment is associated with a user not registered with the server.

16. The server of claim 10,
wherein the at least one processor is further configured to:
when a plurality of users are to share the total amount of the expected payment, receive, from a terminal device of a third user via the communication interface, a disapproval for the approval request, and
in response to receiving the disapproval for the approval request, redetermine the amount to be borne by the second user, and
wherein the account transfer information is generated based on the redetermined amount to be borne by the second user.

17. The server of claim 10,
wherein the account transfer information further includes information on a transfer amount based on the information on the amount to be borne by the second user.

* * * * *